United States Patent
Bojja et al.

(10) Patent No.: US 10,699,073 B2
(45) Date of Patent: *Jun. 30, 2020

(54) SYSTEMS AND METHODS FOR LANGUAGE DETECTION

(71) Applicant: MZ IP Holdings, LLC, Palo Alto, CA (US)

(72) Inventors: Nikhil Bojja, Mountain View, CA (US); Pidong Wang, Cupertino, CA (US); Shiman Guo, Cupertino, CA (US)

(73) Assignee: MZ IP Holdings, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,405

(22) Filed: Dec. 5, 2018

(65) Prior Publication Data

US 2019/0108214 A1   Apr. 11, 2019

Related U.S. Application Data

(63) Continuation of application No. 15/283,646, filed on Oct. 3, 2016, now Pat. No. 10,162,811, which is a
(Continued)

(51) Int. Cl.
*G06F 40/44* (2020.01)
*G06F 40/263* (2020.01)
*G06F 40/232* (2020.01)

(52) U.S. Cl.
CPC .......... *G06F 40/263* (2020.01); *G06F 40/232* (2020.01)

(58) Field of Classification Search
CPC .. G06F 17/28; G06F 17/2809; G06F 17/2818; G06F 17/2827; G06F 17/2836;
(Continued)

(56) References Cited

U.S. PATENT DOCUMENTS

| 4,460,973 A | 7/1984 | Tanimoto et al. |
| 4,502,128 A | 2/1985 | Okajima et al. |

(Continued)

FOREIGN PATENT DOCUMENTS

| CN | 1819018 B | 8/2006 |
| CN | 101414294 A | 4/2009 |

(Continued)

OTHER PUBLICATIONS

"Arabic script in Unicode," downloaded Dec. 22, 2014, from <http://en.wikipedia.org/wiki/Arabic_script_in_Unicode>, 18 pages.
(Continued)

*Primary Examiner* — Lamont M Spooner
(74) *Attorney, Agent, or Firm* — Goodwin Procter LLP

(57) ABSTRACT

Implementations of the present disclosure are directed to a method, a system, and a computer program storage device for identifying a language in a message. Non-language characters are removed from a text message to generate a sanitized text message. An alphabet and/or a script are detected in the sanitized text message by performing at least one of (i) an alphabet-based language detection test to determine a first set of scores and (ii) a script-based language detection test to determine a second set of scores. Each score in the first set of scores represents a likelihood that the sanitized text message includes the alphabet for one of a plurality of different languages. Each score in the second set of scores represents a likelihood that the sanitized text message includes the script for one of the plurality of different languages. The language in the sanitized text message is identified based on at least one of the first set of scores, the second set of scores, and a combination of the first and second sets of scores.

20 Claims, 16 Drawing Sheets

Related U.S. Application Data continuation-in-part of application No. 15/161,913, filed on May 23, 2016, now Pat. No. 9,535,896, which is a continuation of application No. 14/517,183, filed on Oct. 17, 2014, now Pat. No. 9,372,848.

(58) Field of Classification Search
CPC ............. G06F 17/2845; G06F 17/2854; G06F 17/2863; G06F 17/2872; G06F 17/289; G06F 17/2881
USPC ....................................................... 704/2–8
See application file for complete search history.

(56) References Cited

U.S. PATENT DOCUMENTS

| | | | | |
|---|---|---|---|---|
| 4,706,212 | A | 11/1987 | Toma | |
| 5,289,375 | A | 2/1994 | Fukumochi et al. | |
| 5,313,534 | A | 5/1994 | Burel | |
| 5,526,259 | A | 6/1996 | Kaji | |
| 5,603,031 | A | 2/1997 | White et al. | |
| 5,873,055 | A | 2/1999 | Okunishi | |
| 5,884,246 | A | 3/1999 | Boucher et al. | |
| 5,991,710 | A | 11/1999 | Papineni et al. | |
| 6,125,362 | A * | 9/2000 | Elworthy | G06F 17/275 |
| 6,157,905 | A * | 12/2000 | Powell | G06F 17/2217 704/2 |
| 6,167,369 | A * | 12/2000 | Schulze | G06F 17/275 704/10 |
| 6,182,029 | B1 | 1/2001 | Friedman | |
| 6,278,967 | B1 | 8/2001 | Akers et al. | |
| 6,278,969 | B1 | 8/2001 | King et al. | |
| 6,285,978 | B1 | 9/2001 | Bernth et al. | |
| 6,304,841 | B1 | 10/2001 | Berger et al. | |
| 6,415,250 | B1 * | 7/2002 | van den Akker | G06F 17/2715 704/9 |
| 6,425,119 | B1 | 7/2002 | Jones et al. | |
| 6,722,989 | B1 | 4/2004 | Hayashi | |
| 6,799,303 | B2 | 9/2004 | Blumberg | |
| 6,801,190 | B1 | 10/2004 | Robinson et al. | |
| 6,848,080 | B1 | 1/2005 | Lee et al. | |
| 6,993,473 | B2 | 1/2006 | Cartus | |
| 6,996,520 | B2 | 2/2006 | Levin | |
| 7,165,019 | B1 | 1/2007 | Lee et al. | |
| 7,174,289 | B2 | 2/2007 | Sukehiro | |
| 7,451,188 | B2 | 11/2008 | Cheung et al. | |
| 7,475,343 | B1 | 1/2009 | Mielenhausen | |
| 7,478,033 | B2 | 1/2009 | Wu et al. | |
| 7,533,013 | B2 | 5/2009 | Marcu | |
| 7,539,619 | B1 | 5/2009 | Seligman et al. | |
| 7,895,576 | B2 | 2/2011 | Chang et al. | |
| 7,912,852 | B1 | 3/2011 | McElroy | |
| 7,970,598 | B1 | 6/2011 | Flanagan et al. | |
| 8,010,338 | B2 | 8/2011 | Thorn | |
| 8,010,474 | B1 | 8/2011 | Bill | |
| 8,027,438 | B2 | 9/2011 | Daigle et al. | |
| 8,112,497 | B1 | 2/2012 | Gougousis et al. | |
| 8,145,472 | B2 | 3/2012 | Shore et al. | |
| 8,170,868 | B2 * | 5/2012 | Gamon | G06F 17/27 704/1 |
| 8,244,567 | B2 | 8/2012 | Estill | |
| 8,270,606 | B2 | 9/2012 | Caskey et al. | |
| 8,311,800 | B1 | 11/2012 | Delaney et al. | |
| 8,326,601 | B2 | 12/2012 | Ribeiro et al. | |
| 8,380,488 | B1 * | 2/2013 | Liu | G06F 17/2217 704/10 |
| 8,392,173 | B2 | 3/2013 | Davis et al. | |
| 8,401,839 | B2 | 3/2013 | Kim et al. | |
| 8,442,813 | B1 | 5/2013 | Popat | |
| 8,468,149 | B1 | 6/2013 | Lung et al. | |
| 8,473,555 | B2 | 6/2013 | Lai et al. | |
| 8,510,328 | B1 | 8/2013 | Hatton | |
| 8,543,374 | B2 | 9/2013 | Dymetman | |
| 8,566,306 | B2 | 10/2013 | Jones | |
| 8,606,297 | B1 | 12/2013 | Simkhai et al. | |
| 8,606,800 | B2 | 12/2013 | Lagad et al. | |
| 8,626,486 | B2 | 1/2014 | Och et al. | |
| 8,655,644 | B2 | 2/2014 | Kanevsky et al. | |
| 8,671,019 | B1 | 3/2014 | Barclay et al. | |
| 8,682,529 | B1 | 3/2014 | Church et al. | |
| 8,688,433 | B2 | 4/2014 | Davis et al. | |
| 8,688,451 | B2 | 4/2014 | Grost et al. | |
| 8,738,355 | B2 | 5/2014 | Gupta et al. | |
| 8,762,128 | B1 | 6/2014 | Brants et al. | |
| 8,788,259 | B1 * | 7/2014 | Buryak | G06F 9/454 704/8 |
| 8,818,791 | B2 | 8/2014 | Xiao et al. | |
| 8,825,467 | B1 | 9/2014 | Chen et al. | |
| 8,825,469 | B1 | 9/2014 | Duddu et al. | |
| 8,832,204 | B1 | 9/2014 | Gailloux et al. | |
| 8,838,437 | B1 * | 9/2014 | Buryak | G06F 9/454 704/8 |
| 8,886,518 | B1 | 11/2014 | Wang et al. | |
| 8,914,395 | B2 | 12/2014 | Jiang | |
| 8,918,308 | B2 | 12/2014 | Caskey et al. | |
| 8,928,591 | B2 * | 1/2015 | Swartz | G06F 3/0237 345/168 |
| 8,935,147 | B2 | 1/2015 | Stern et al. | |
| 8,990,064 | B2 | 3/2015 | Marcu et al. | |
| 8,990,068 | B2 | 3/2015 | Orsini et al. | |
| 8,996,352 | B2 | 3/2015 | Orsini et al. | |
| 8,996,353 | B2 | 3/2015 | Orsini et al. | |
| 8,996,355 | B2 | 3/2015 | Orsini et al. | |
| 9,031,828 | B2 | 5/2015 | Leydon et al. | |
| 9,031,829 | B2 | 5/2015 | Leydon et al. | |
| 9,141,607 | B1 * | 9/2015 | Lee | G06F 17/289 |
| 9,231,898 | B2 | 1/2016 | Orsini et al. | |
| 9,245,278 | B2 | 1/2016 | Orsini et al. | |
| 9,298,703 | B2 | 3/2016 | Leydon et al. | |
| 9,336,206 | B1 | 5/2016 | Orsini et al. | |
| 9,348,818 | B2 | 5/2016 | Leydon et al. | |
| 9,372,848 | B2 | 6/2016 | Bojja et al. | |
| 9,448,996 | B2 | 9/2016 | Orsini et al. | |
| 9,535,896 | B2 | 1/2017 | Bojja et al. | |
| 9,600,473 | B2 | 3/2017 | Leydon et al. | |
| 9,665,571 | B2 | 5/2017 | Leydon et al. | |
| 2001/0020225 | A1 | 9/2001 | Zerber | |
| 2001/0029455 | A1 | 10/2001 | Chin et al. | |
| 2002/0022954 | A1 | 2/2002 | Shimohata et al. | |
| 2002/0029146 | A1 | 3/2002 | Nir | |
| 2002/0037767 | A1 | 3/2002 | Ebin | |
| 2002/0099744 | A1 | 7/2002 | Coden et al. | |
| 2002/0152063 | A1 | 10/2002 | Tokieda et al. | |
| 2002/0169592 | A1 | 11/2002 | Aityan | |
| 2002/0198699 | A1 | 12/2002 | Greene et al. | |
| 2003/0009320 | A1 | 1/2003 | Furuta | |
| 2003/0033152 | A1 | 2/2003 | Cameron | |
| 2003/0033595 | A1 | 2/2003 | Takagi et al. | |
| 2003/0046350 | A1 | 3/2003 | Chintalapati et al. | |
| 2003/0101044 | A1 | 5/2003 | Krasnov | |
| 2003/0125927 | A1 | 7/2003 | Seme | |
| 2003/0176995 | A1 | 9/2003 | Sukehiro | |
| 2003/0191626 | A1 | 10/2003 | Al-Onaizan et al. | |
| 2004/0030750 | A1 | 2/2004 | Moore et al. | |
| 2004/0030781 | A1 | 2/2004 | Etesse et al. | |
| 2004/0044517 | A1 | 3/2004 | Palmquist | |
| 2004/0093567 | A1 | 5/2004 | Schabes et al. | |
| 2004/0102201 | A1 | 5/2004 | Levin | |
| 2004/0102956 | A1 | 5/2004 | Levin | |
| 2004/0102957 | A1 | 5/2004 | Levin | |
| 2004/0158471 | A1 | 8/2004 | Davis et al. | |
| 2004/0205671 | A1 | 10/2004 | Sukehiro et al. | |
| 2004/0210443 | A1 | 10/2004 | Kuhn et al. | |
| 2004/0215647 | A1 | 10/2004 | Farn et al. | |
| 2004/0243409 | A1 | 12/2004 | Nakagawa | |
| 2004/0267527 | A1 | 12/2004 | Creamer et al. | |
| 2005/0038643 | A1 | 2/2005 | Koehn | |
| 2005/0076240 | A1 | 4/2005 | Appleman | |
| 2005/0102130 | A1 | 5/2005 | Quirk et al. | |
| 2005/0160075 | A1 | 7/2005 | Nagahara | |
| 2005/0165642 | A1 | 7/2005 | Brouze et al. | |
| 2005/0171758 | A1 | 8/2005 | Palmquist | |
| 2005/0197829 | A1 | 9/2005 | Okumura | |
| 2005/0209844 | A1 | 9/2005 | Wu et al. | |
| 2005/0234702 | A1 | 10/2005 | Komiya | |

(56) References Cited

U.S. PATENT DOCUMENTS

| | | |
|---|---|---|
| 2005/0251384 A1 | 11/2005 | Yang |
| 2005/0283540 A1 | 12/2005 | Fux et al. |
| 2005/0288920 A1 | 12/2005 | Green et al. |
| 2006/0053203 A1 | 3/2006 | Mijatovic |
| 2006/0101021 A1 | 5/2006 | Davis et al. |
| 2006/0133585 A1 | 6/2006 | Daigle et al. |
| 2006/0136223 A1 | 6/2006 | Brun et al. |
| 2006/0167992 A1 | 7/2006 | Cheung et al. |
| 2006/0173839 A1 | 8/2006 | Knepper et al. |
| 2006/0206309 A1 | 9/2006 | Curry et al. |
| 2006/0217955 A1 | 9/2006 | Nagao et al. |
| 2006/0242232 A1 | 10/2006 | Murillo et al. |
| 2006/0247917 A1* | 11/2006 | Fux .................. G06F 17/2735 704/9 |
| 2006/0271352 A1 | 11/2006 | Nikitin et al. |
| 2006/0287848 A1 | 12/2006 | Li et al. |
| 2007/0011132 A1 | 1/2007 | Zhou et al. |
| 2007/0011235 A1 | 1/2007 | Mutikainen et al. |
| 2007/0016399 A1 | 1/2007 | Gao et al. |
| 2007/0038758 A1 | 2/2007 | Mu et al. |
| 2007/0050182 A1 | 3/2007 | Sneddon et al. |
| 2007/0077975 A1 | 4/2007 | Warda |
| 2007/0088793 A1 | 4/2007 | Landsman |
| 2007/0124133 A1 | 5/2007 | Wang et al. |
| 2007/0124202 A1 | 5/2007 | Simons |
| 2007/0129935 A1 | 6/2007 | Uchimoto et al. |
| 2007/0130258 A1 | 6/2007 | Almberg |
| 2007/0143410 A1 | 6/2007 | Kraft et al. |
| 2007/0168450 A1 | 7/2007 | Prajapat et al. |
| 2007/0218997 A1 | 9/2007 | Cho |
| 2007/0219774 A1 | 9/2007 | Quirk et al. |
| 2007/0219776 A1* | 9/2007 | Gamon .................. G06F 17/27 704/9 |
| 2007/0219777 A1 | 9/2007 | Chu et al. |
| 2007/0294076 A1 | 12/2007 | Shore et al. |
| 2008/0005319 A1 | 1/2008 | Anderholm et al. |
| 2008/0005325 A1 | 1/2008 | Wynn et al. |
| 2008/0052289 A1 | 2/2008 | Kolo et al. |
| 2008/0065369 A1* | 3/2008 | Fux .................. G06F 17/275 704/8 |
| 2008/0097745 A1 | 4/2008 | Bagnato et al. |
| 2008/0097746 A1* | 4/2008 | Tagata .................. G06F 17/275 704/8 |
| 2008/0120374 A1 | 5/2008 | Kawa et al. |
| 2008/0126077 A1* | 5/2008 | Thorn .................. G06F 3/0237 704/8 |
| 2008/0147380 A1 | 6/2008 | Barliga et al. |
| 2008/0147408 A1 | 6/2008 | Da Palma et al. |
| 2008/0176655 A1 | 7/2008 | James et al. |
| 2008/0177528 A1 | 7/2008 | Drewes |
| 2008/0183459 A1 | 7/2008 | Simonsen et al. |
| 2008/0208596 A1 | 8/2008 | Heinze |
| 2008/0243834 A1 | 10/2008 | Rieman et al. |
| 2008/0249760 A1 | 10/2008 | Marcu et al. |
| 2008/0270553 A1 | 10/2008 | Mu |
| 2008/0274694 A1 | 11/2008 | Castell et al. |
| 2008/0281577 A1 | 11/2008 | Suzuki |
| 2008/0313534 A1 | 12/2008 | Cheung et al. |
| 2008/0320086 A1 | 12/2008 | Callanan et al. |
| 2009/0011829 A1 | 1/2009 | Yang |
| 2009/0049513 A1 | 2/2009 | Root et al. |
| 2009/0055175 A1 | 2/2009 | Terrell, II et al. |
| 2009/0068984 A1 | 3/2009 | Burnett |
| 2009/0100141 A1 | 4/2009 | Kirkland et al. |
| 2009/0106695 A1 | 4/2009 | Perry et al. |
| 2009/0125477 A1 | 5/2009 | Lu et al. |
| 2009/0204400 A1 | 8/2009 | Shields et al. |
| 2009/0204596 A1 | 8/2009 | Brun et al. |
| 2009/0221372 A1 | 9/2009 | Casey et al. |
| 2009/0234635 A1 | 9/2009 | Bhatt et al. |
| 2009/0271212 A1 | 10/2009 | Savjani et al. |
| 2009/0276500 A1 | 11/2009 | Karmarkar |
| 2009/0324005 A1 | 12/2009 | Georgiev et al. |
| 2010/0015581 A1 | 1/2010 | DeLaurentis |
| 2010/0036661 A1 | 2/2010 | Boucher et al. |
| 2010/0099444 A1 | 4/2010 | Coulter et al. |
| 2010/0114559 A1 | 5/2010 | Kim et al. |
| 2010/0138210 A1 | 6/2010 | Seo et al. |
| 2010/0145900 A1 | 6/2010 | Zheng et al. |
| 2010/0180199 A1 | 7/2010 | Wu et al. |
| 2010/0204981 A1 | 8/2010 | Ribeiro et al. |
| 2010/0235751 A1 | 9/2010 | Stewart |
| 2010/0241482 A1 | 9/2010 | Knyphausen et al. |
| 2010/0261534 A1 | 10/2010 | Lee et al. |
| 2010/0268730 A1 | 10/2010 | Kazeoka |
| 2010/0293230 A1 | 11/2010 | Lai et al. |
| 2010/0312545 A1 | 12/2010 | Sites |
| 2010/0324894 A1 | 12/2010 | Potkonjak |
| 2011/0022381 A1 | 1/2011 | Gao et al. |
| 2011/0035210 A1 | 2/2011 | Rosenfeld et al. |
| 2011/0055233 A1 | 3/2011 | Weber et al. |
| 2011/0066421 A1 | 3/2011 | Lee et al. |
| 2011/0071817 A1* | 3/2011 | Siivola .................. G06F 17/275 704/8 |
| 2011/0077933 A1 | 3/2011 | Miyamoto et al. |
| 2011/0077934 A1 | 3/2011 | Kanevsky et al. |
| 2011/0082683 A1 | 4/2011 | Soricut et al. |
| 2011/0082684 A1 | 4/2011 | Soricut et al. |
| 2011/0098117 A1 | 4/2011 | Tanaka |
| 2011/0184736 A1 | 7/2011 | Slotznick |
| 2011/0191096 A1 | 8/2011 | Sarikaya et al. |
| 2011/0202334 A1 | 8/2011 | Abir |
| 2011/0202344 A1 | 8/2011 | Meyer et al. |
| 2011/0213607 A1 | 9/2011 | Onishi |
| 2011/0219084 A1 | 9/2011 | Borra et al. |
| 2011/0238406 A1 | 9/2011 | Chen et al. |
| 2011/0238411 A1 | 9/2011 | Suzuki |
| 2011/0239278 A1 | 9/2011 | Downey et al. |
| 2011/0246881 A1 | 10/2011 | Kushman et al. |
| 2011/0307241 A1 | 12/2011 | Waibel et al. |
| 2011/0307356 A1 | 12/2011 | Wiesinger et al. |
| 2011/0307495 A1 | 12/2011 | Shoshan |
| 2011/0313779 A1 | 12/2011 | Herzog et al. |
| 2011/0320019 A1 | 12/2011 | Lanciani et al. |
| 2012/0072204 A1* | 3/2012 | Nasri .................. G06F 17/2229 704/9 |
| 2012/0095748 A1* | 4/2012 | Li .................. G06F 16/951 704/8 |
| 2012/0109631 A1 | 5/2012 | Gopal et al. |
| 2012/0156668 A1 | 6/2012 | Zelin |
| 2012/0173502 A1 | 7/2012 | Kumar et al. |
| 2012/0179449 A1 | 7/2012 | Raskino et al. |
| 2012/0179451 A1 | 7/2012 | Miyamoto et al. |
| 2012/0191445 A1 | 7/2012 | Markman et al. |
| 2012/0209852 A1 | 8/2012 | Dasgupta et al. |
| 2012/0226491 A1* | 9/2012 | Yamazaki .................. G10L 15/06 704/8 |
| 2012/0233191 A1 | 9/2012 | Ramanujam |
| 2012/0240039 A1 | 9/2012 | Walker et al. |
| 2012/0246564 A1* | 9/2012 | Kolo .................. G06F 17/2863 715/264 |
| 2012/0253785 A1* | 10/2012 | Hamid .................. G06F 17/2229 704/4 |
| 2012/0262296 A1 | 10/2012 | Bezar |
| 2012/0265518 A1 | 10/2012 | Lauder |
| 2012/0277003 A1 | 11/2012 | Eliovits et al. |
| 2012/0290288 A1 | 11/2012 | Ait-Mokhtar |
| 2012/0303355 A1 | 11/2012 | Liu et al. |
| 2013/0006954 A1 | 1/2013 | Nikoulina et al. |
| 2013/0084976 A1 | 4/2013 | Kumaran et al. |
| 2013/0085747 A1 | 4/2013 | Li et al. |
| 2013/0091429 A1 | 4/2013 | Weng et al. |
| 2013/0096911 A1 | 4/2013 | Beaufort et al. |
| 2013/0103493 A1 | 4/2013 | Gao et al. |
| 2013/0124185 A1 | 5/2013 | Sarr et al. |
| 2013/0124186 A1 | 5/2013 | Donabedian et al. |
| 2013/0130792 A1 | 5/2013 | Crocker et al. |
| 2013/0138428 A1 | 5/2013 | Chandramouli et al. |
| 2013/0144599 A1 | 6/2013 | Davis et al. |
| 2013/0151237 A1 | 6/2013 | Hyde |
| 2013/0173247 A1 | 7/2013 | Hodson |
| 2013/0197896 A1 | 8/2013 | Chalabi et al. |
| 2013/0211821 A1 | 8/2013 | Tseng et al. |

(56) References Cited

U.S. PATENT DOCUMENTS

| | | | |
|---|---|---|---|
| 2013/0226553 | A1 | 8/2013 | Ji |
| 2013/0253834 | A1 | 9/2013 | Slusar |
| 2013/0297316 | A1 | 11/2013 | Cragun et al. |
| 2014/0006003 | A1 | 1/2014 | Soricut et al. |
| 2014/0058807 | A1 | 2/2014 | Altberg et al. |
| 2014/0142917 | A1 | 5/2014 | D'Penha |
| 2014/0163951 | A1 | 6/2014 | Nikoulina et al. |
| 2014/0188453 | A1 | 7/2014 | Marcu et al. |
| 2014/0199975 | A1 | 7/2014 | Lou et al. |
| 2014/0200878 | A1 | 7/2014 | Mylonakis et al. |
| 2014/0208367 | A1 | 7/2014 | DeWeese et al. |
| 2014/0330760 | A1 | 11/2014 | Meier et al. |
| 2014/0379329 | A1 | 12/2014 | Dong et al. |
| 2015/0006148 | A1* | 1/2015 | Goldszmit ............ G06F 17/275 704/8 |
| 2015/0127322 | A1 | 5/2015 | Clark |
| 2015/0161104 | A1* | 6/2015 | Buryak ................ G06F 17/275 704/8 |
| 2015/0161114 | A1* | 6/2015 | Buryak ................ G06F 17/289 704/8 |
| 2015/0161227 | A1* | 6/2015 | Buryak .................. G06F 9/454 707/738 |
| 2015/0186355 | A1* | 7/2015 | Baldwin .............. G06F 17/273 704/9 |
| 2015/0199333 | A1 | 7/2015 | Nekhay |
| 2015/0363394 | A1 | 12/2015 | Marciano et al. |
| 2016/0036740 | A1* | 2/2016 | Barber ................. H04L 51/063 704/3 |
| 2016/0267070 | A1 | 9/2016 | Bojja et al. |
| 2017/0300453 | A1 | 10/2017 | Shen et al. |

FOREIGN PATENT DOCUMENTS

| | | |
|---|---|---|
| CN | 101563683 A | 10/2009 |
| CN | 101645269 A | 2/2010 |
| EP | 1691299 A2 | 8/2006 |
| JP | 2000-194696 A | 7/2000 |
| JP | 2002041432 A | 2/2002 |
| JP | 2003054841 A | 2/2003 |
| JP | 2003529845 A | 10/2003 |
| JP | 2004252881 A | 9/2004 |
| JP | 2006221658 A | 8/2006 |
| JP | 2006277103 A | 10/2006 |
| JP | 2006302091 A | 11/2006 |
| JP | 2006350628 A | 12/2006 |
| JP | 2009134344 A | 6/2009 |
| JP | 2009140073 A | 6/2009 |
| JP | 2010129057 A | 6/2010 |
| JP | 2010152785 A | 7/2010 |
| JP | 2012103554 A | 5/2012 |
| JP | 2014519104 A | 8/2014 |
| WO | WO-2008/075161 A2 | 6/2008 |
| WO | WO-2009/129315 A1 | 10/2009 |
| WO | WO-2013/133966 A1 | 9/2013 |
| WO | WO-2014/124397 A1 | 8/2014 |

OTHER PUBLICATIONS

"Bleu," accessed on the internet at: https://en.wikipedia.org/wiki/BLEU; downloaded Dec. 1, 2018; 5 pgs.
"Chromium-compact-language-detector," downloaded Dec. 22, 2014, from <https://code.google.com/p/chromium-compact-language-detector/>, 1 page.
"CJK Unified Ideographs," downloaded Dec. 22, 2014, from <http://en.wikipedia.org/wiki/CJK_Unified_Ideographs>, 11 pages.
"cld2," downloaded Dec. 22, 2014, from <https://code.google.com/p/cld2/>, 2 pages.
"Cloud Translation API documentation," accessed on the internet at: <https://cloud.google.com/translate/docs/>; downloaded Dec. 1, 2018; 2 pgs.
"Cyrillic script in Unicode," downloaded Dec. 22, 2014, from <http://en.wikipedia.org/wiki/Cyrillic_script_in_Unicode>, 22 pages.
"Dakuten and handakuten," accessed on the internet at: https://en.wikipedia.org/wiki/Dakuten_and_handakuten>; downloaded Dec. 1, 2018; 4 pgs.
"Detect Method," downloaded Dec. 22, 2014, from <http://msdn.microsoft.com/en-us/library/ff512411.aspx>, 5 pages.
"GitHub," downloaded Dec. 22, 2014, from <https://github.com/feedbackmine/language_detector>, 1 page.
"Google Translate API," downloaded Dec. 22, 2014, from <https://cloud.google.com/translate/vZ/using_rest>, 12 pages.
"ldig (Language Detection with Infinity Gram)," downloaded Dec. 22, 2014, from <https://github.com/shuyo/ldig>, 3 pages.
"Language identification," downloaded Dec. 22, 2014, from <http://en.wikipedia.org/wiki/Language_identification>, 5 pages.
"Languages and Scripts, CLDR Charts," downloaded Dec. 22, 2014, from <http://www.unicode.org/cldr/charts/latest/supplemental/languages_and_scripts.html>, 23 pages.
"Latin script in Unicode," downloaded Dec. 22, 2014, from <http://en.wikipedia.org/wiki/Latin_script_in_Unicode>, 5 pages.
"Microsoft Translator Text API," accessed on the internet at: https://www.microsoft.com/en-us/translator/translatorapi.aspx; downloaded on Dec. 1, 2018.
"Mimer SQL Unicode Collation Charts," downloaded Dec. 22, 2014, from <http://developer.mimer.com/charts/index.tml>, 2 pages.
"Multi Core and Parallel Processing," accessed on the internet at stackoverflow.com/questions/1922465/multi-core-and-parallel-processing, published Dec. 17, 2009; downloaded on Jun. 30, 2015; 2 pgs.
"Scripts and Languages," downloaded Dec. 22, 2014, from <http://www.unicode.org/cldr/charts/latest/supplemental/scripts_and_languages.html>, 23 pages.
"Supported Script," downloaded Dec. 22, 2014, from <http://www.unicode.org/standard/supported.html>, 3 pages.
"Unicode Character Ranges," downloaded Dec. 22, 2014, from <http://jrgraghix.net/research/unicode_blocks.php>, 1 page.
"Uscript.h File Reference," downloaded Dec. 22, 2014, from <http://icu-project.org/apiref/icu4c/uscript_8h.html>, 34 pages.
Ahmed, B. et al., "Language Identification from Text Using n-gram Based Cumulative Frequency Addition," In Proceedings of Student/Faculty Research Day, CSIS, Pace University; pp. 12.1-12.8; May 2004.
Aikawa et al., "The Impact of Crowdsourcing Post-editing with the Collaborative Translation Framework," JapTAL Oct. 22-24, 2012; LNAI; 7614:1-10.
Ambati et al., "Collaborative Workflow for Crowdsourcing Translation," Proc. of the ACM 2012 conf. on Computer Supported Cooperative Work, ACM; 1191-1194; Feb. 11-15, 2012.
Baldwin, et al., "Language identification: The long and the short of the matter," In Proceedings of NAACL-HLT, 2010, pp. 229-237.
Bender, O. et al., "Maximum Entropy Models for Named Entity Recognition," CONLL '03 Proc. of the 7th Conference on Natural language Learning at HLT-NAACL; vol. 4, pp. 148-151; May 31, 2003.
Bergsma et al., "Language identification for creating language-specific Twitter collections," IN Proceeding of the Second Workshop on Language in Social Media, 2012, pp. 65-74.
Bontcheva, K. et al., "TwitIE: An Open-Source Information Extraction Pipeline for Microblog Text," Proc. of the Int'l Conference on Recent Advances in Natural Language Processing, ACL; 8pgs; Sep. 5, 2013.
Brown, Ralf D. "Adding Linguistic Knowledge to a Lexical Example-Based Translation System," Proc. of the 8th Int'l Conference on Theoretical and Methodological Issues in Machine Translation (TMI-99); pp. 22-32; Aug. 1999.
Callison-Burch et al., "Creating Speech and Language Data with Amazon's Mechanical Turk", Proceedings of the NAACL HLT 2010 Workshop on Creating Speech and Language Data with Amazon's Mechanical Turk; 1-12, Jun. 6, 2010.
Callison-Burch, C. "Fast, Cheap, and Creative: Evaluating Translation Quality Using Amazon's Mechanical Turk," Proceedings of the 2009 Conference on Empirical Methods in Natural Language Processing, pp. 286-295, Singapore, Aug. 6-7, 2009.

(56) References Cited

OTHER PUBLICATIONS

Carter et al., "Microblog language identification: Overcoming the limitations of short, unedited and idiomatic text," Language Recourses and Evaluation, 2013, vol. 47, No. 1, pp. 195-215.
Cavnar et al., "N-gram-based text categorization," In Proceedings of the Third Symposium on Document Analysis and Information Retrieval, 1994, 14 pgs.
Ceylan et al., "Language identification of search engine queries," In Proceedings of ACL-IJCNLP, 2009, pp. 1066-1074.
Chang et al., "LIBSVM: A library for support vector machines, ACM Transactions on Intelligent Systems and Technology," vol. 2, No. 27, pp. 1-27:27, 2011, Software available at http://www.csie.ntu.edu.tw/*cjlin/libsvm.
Chieu H.L. and Ng, H.T., "Named Entity Recognition with a Maximum Entropy Approach," CONLL '03 Proc. of the 7th Conference on Natural language Learning at HLT-NAACL; vol. 4, pp. 160-163; May 31, 2003.
Ciaramita et al., "Named-Entity Recognition in Novel Domains with External Lexical Knowledge," Proceedings of the NIPS Workshop on Advances in Structured Learning for Text and Speech Processing; Canada; Dec. 9, 2005; abstract, Section 2.
Cunningham, H., et al., "Gate: An Architecture for Development of Robust hlt Applications," ACL '02 Proc. of the 40th Annual Meeting on Association for Computational Linguistics; pp. 168-175; Jul. 6, 2002.
Curran, J.R. and Clark, S., "Language Independent NER using a Maximum Entropy Tagger," CONLL '03 Proc. of the 7th Conference on Natural language Learning at HLT-NAACL; vol. 4, pp. 164-167; May 31, 2003.
Dunning, "Statistical identification of language," Computing Research Laboratory, New Mexico State University, 1994, 31 pgs.
Examiner's Report for Canadian Application No. 2,913,984; dated Oct. 19, 2016; 5 pgs.
Extended European Search Report of the EPO in EP2954522; dated Sep. 7, 2016; 7 pgs.
Fan et al., "LIBLINEAR: A library for large linear classification," Journal of Machine Learning Research, 2008, vol. 9, pp. 1871-1874.
Finkel, J., et al., "Incorporating Non-local Information into Information Extraction Systems by Gibbs Sampling," ACL '05 Proc. of the 43rd Annual Meeting on Association for Computational Linguistics , pp. 363-370; Jun. 25, 2005.
Foster et al., "Hardtoparse: POS tagging and pursing the twitterverse," In Proceedings of the AAAI Workshop on Analyzing Microtext, 2011, 7 pgs.
Gottron et al., "A comparison of language identification approaches on short, query-style texts," In Advances in information retrieval, 2010, pp. 611-614.
Grothe et al., "A comparative study on language identification methods," In Proceedings of LREC, 2008, pp. 980-985.
Hakkinen et al., "N-Gram and Decision Tree Based Language Identification for Written Words," IEEE Workshop, Dec. 9, 2001, pp. 335-338.
Hughes et al., "Reconsidering language identification for written language resources," In Proceedings of LREC, 2006, 5 pgs.
Hulin et al., "Applications of Item Response Theory to Analysis of Attitude Scale Translations," American Psychological Association; vol. 67(6); Dec. 1982; 51 pgs.
Int'l Search Report and Written Opinion of the ISA/EP in PCT/US2014/040676; dated May 6, 2015; 16 pgs.
Int'l Search Report and Written Opinion of the ISA/EP in PCT/US2014/061141; dated Jun. 16, 2015; 13 pgs.
Int'l Search Report and Written Opinion of the ISA/EP in PCT/US2017/012102; dated Apr. 18, 2017; 14 pgs.
Int'l Search Report and Written Opinion of the ISA/EP in PCT/US2017/054722; dated Jan. 10, 2018; 13 pgs.
Int'l Search Report and Written Opinion of the ISA/EP in PCT/US2018/051646; dated Jan. 4, 2019; 13 pgs.
Int'l Search Report of the ISA/US in PCT/US2014/015632; dated Jul. 8, 2014; 8 pgs.
Lafferty, J., et al., "Conditional Random Fields: Probabilistic Models for Segmenting and Labeling Sequence Data," ICML '01 Proc. of the Eighteenth International Conference on Machine Learning; pp. 282-289; Jun. 28, 2001.
Little, G., "Turkit: Tools for Iterative Tasks on Mechanical Turk," IEEE Symposium on Visual Languages and Human-Centric Computing; pp. 252-253; Sep. 20, 2009.
Liu et al., A broad-coverage normalization system for social media language,: In Proceeding of ACL, 2012, pp. 1035-1044.
Liu et al., "Recognizing named entities in tweets," In Proceedings of ACL-HLT, 2011, pp. 359-367.
Lui et al., "Accurate Language Identification of Twitter Messages," Proceedings of the 5th Workshop on Language Analysis for Social Media (LASM) @ EACL 2014, pp. 17-25, Gothenburg, Sweden, Apr. 26-30, 2014.
Lui et al., "Automatic Detection and Language Identification of Multilingual Documents," Transactions of the Association for Computational Linguistics, pp. 27-40, published Feb. 2014.
Lui et al., "Cross-domain Feature Selection for Language Identification," Proceedings of the 5th International Joint Conference on Natural Language Processing, pp. 553-561, Chiang Mai, Thailand, Nov. 8-13, 2011.
Lui et al., "langid.py: An Off-the-shelf Language Identification Tool," Proceedings of the 50th Annual Meeting of the Association for Computational Linguistics, pp. 25-30, Jeju, Republic of Korea, Jul. 8-14, 2012.
Minkov, E., et al., "Extracting Personal Names from Email: Applying Named Entity Recognition to Informal Text," HLT '05 Proc. of the Conference on Human Language Technology and Empirical Methods in Natural Language Processing; pp. 443-450; Oct. 6, 2005.
Mizuta et al., "Language Identification Using Statistical Hypothesis Testing for Similar Languages," IPSJ SIG Technical Reports, JP, Information Processing Society of Japan, Nov. 19, 2008, vol. 2008, No. 113, pp. 91-98.
Monteith, Kristine, et al., "Turning Bayesian Model Averaging Into Bayesian Model Combination," Proceedings of the International Joint Conference on Neural Networks IJCNN'11. pp. 2657-2663, 2011.
Och, F.J. and Ney, H., "A Systematic Comparison of Various Statistical Alignment Models," Computational Linguistics; 29(1):19-51; Mar. 1, 2003.
Office Action (Translated) in Japanese Patent Application No. 2017-520499; dated Sep. 11, 2018; 9 pgs.
Office Action (Translated) in Korean Patent Application No. 10-2016-7000062; dated Oct. 14, 2016; 6 pgs.
Okazaki, N., CRFsuite: A Fast Implementation of Conditional Random Fields (CRFs); accessed on the internet at http://www.chokkan.org/software/crfsuite/; downloaded Jan. 8, 2016; Published Jul. 22, 2015; 4 pgs.
Papineni, K., et al. "BLEU: A Method for Automatic Evaluation of Machine Translation," Proc. 40th Annual Meeting on Assoc. for Computational Linguistics (ACL); Jul. 2002; pp. 311-318.
Partial Int'l Search Report of the ISA/EP in PCT/US2014/040676; dated Feb. 17, 2015; 5 pgs.
Popovic et al., "Syntax-oriented Evaluation Measures for Machine Translation Output," Proc. of the Fourth Workshop on Statistical Machine Translation, pp. 29-32, Mar. 30-31, 2009.
Qureshi et al., Collusion Detection and Prevention with FIRE+ Trust and Reputation Model, 2010, IEEE, Computer and Information Technology (CIT), 2010 IEEE 10th International Conference, pp. 2548-2555; Jun. 2010.
Ritter et al., "Named entity recognition in tweets: An experimental study," In Proceedings of EMNLP, 2011, pp. 1524-1534.
Rouse, M., "Parallel Processing," Search Data Center.com; Mar. 27, 2007; 2 pgs.
Sang, E., et al., "Introduction to the CoNLL-2003 Shared Task: Language-independent Named Entity Recognition," CONLL '03 Proc. of the 7th Conference on Natural language Learning at HLT-NAACL; vol. 4, pp. 142-147; May 31, 2003.
Shieber, S.M., and Nelken R., "Abbreviated Text Input Using Language Modeling." Natural Language Eng; 13(2):165-183; Jun. 2007.

(56) References Cited

OTHER PUBLICATIONS

Tromp et al., "Graphbased n-gram language identification on short texts," In Proceedings of the 20th Machine Learning conference of Belgium and The Netherlands, 2011, 8 pgs.

Vatanen et al., "Language identification of short text segments with n-gram models," In Proceedings of LREC, 2010, pp. 3423-3430.

Vogel et al., "Robust language identification in short, noisy texts: Improvements to LIGA," In Proceedings of the Third International Workshop on Mining Ubiquitous and Social Environment, 2012, pp. 43-50.

Written Opinion of the Austrian Patent Office in Singapore App. No. 11201509840Y dated Mar. 1, 2016; 12 pgs.

Xia, F. and Lewis, W.D., "Applying NLP Technologies to the Collection and Enrichment of Language Data on the Web to Aid Linguistic Research," Proc. of the EACL 2009 Workshop on Language Tech. and Resources for Cultural Heritage, Social Sciences, Humanities, and Education-LaTech—SHELT&R 2009; pp. 51-59; Mar. 2009.

Zaidan et al., "Crowdsourcing Translation: Professional Quality from Non-Professionals," Proceedings of the 49th Annual Meeting of the Association for Computational Linguistics, pp. 1220-1229, Portland, Oregon, Jun. 19-24, 2011.

\* cited by examiner

SYSTEMS AND METHODS FOR LANGUAGE DETECTION

This application is a continuation of U.S. application Ser. No. 15/283,646, filed Oct. 3, 2016, which is a continuation-in-part of U.S. application Ser. No. 15/161,913, filed May 23, 2016 (now U.S. Pat. No. 9,535,896, issued Jan. 3, 2017), which is a continuation of U.S. application Ser. No. 14/517,183, filed Oct. 17, 2014 (now U.S. Pat. No. 9,372,848, issued Jun. 21, 2016), the entire contents of each of which are incorporated by reference herein.

BACKGROUND

The present disclosure relates to language detection and, in particular, to systems and methods for detecting languages in short text messages.

In general, language detection or identification is a process in which a language present in a body of text is detected automatically based on the content of the text. Language detection is useful in the context of automatic language translation, where the language of a text message must generally be known before the message can be translated accurately into a different language.

While traditional language detection is usually performed on a collection of many words and sentences (i.e., on the document level), a particularly challenging domain is the chat text domain, where messages often include only a few words (e.g., four or less), some or all of which can be informal and/or misspelled. In the chat text domain, existing language detection approaches have proven to be inaccurate and/or slow, given the lack of information and the informalities present in such messages.

SUMMARY

Embodiments of the systems and methods described herein are used to detect the language in a text message based on, for example, content of the message, information about the keyboard used to generate the message, and/or information about the language preferences of the user who generated the message. Compared to previous language detection techniques, the systems and methods described herein are generally faster and more accurate, particularly for short text messages (e.g., of four words or less).

In various examples, the systems and methods use a plurality of language detection tests and classifiers to determine probabilities associated with possible languages in a text message. Each language detection test can output a set or vector of probabilities associated with the possible languages. The classifiers can combine the output from the language detection tests to determine a most likely language for the message. The particular language detection test(s) and classifier(s) chosen for the message can depend on a predicted accuracy, a confidence score, and/or a linguistic domain for the message.

Certain examples of the systems and methods described herein perform an initial classification of a language in a text message so that more focused language detection techniques can be performed to make a final determination of the language. For example, the systems and methods can perform initial language detection testing on a text message to identify a group or category (e.g., Cyrillic languages or Latin languages) for the language in the text message. Once the language category is identified, language detection techniques designed for the language category can be used to identify the specific language in the message. In preferred examples, extraneous elements (e.g., emoji or numerical digits or characters) are removed from the text message prior to language detection, thereby resulting in faster and more accurate language detection. The systems and methods described herein are generally more accurate and efficient than prior language detection approaches. The systems and methods can be configured to use any one or more of the language detection methods described herein.

In one aspect, the subject matter of this disclosure relates to a computer-implemented method of identifying a language in a message. The method includes: obtaining a text message; removing non-language characters from the text message to generate a sanitized text message; and detecting at least one of an alphabet and a script present in the sanitized text message, wherein detecting includes at least one of: (i) performing an alphabet-based language detection test to determine a first set of scores, wherein each score in the first set of scores represents a likelihood that the sanitized text message includes the alphabet for one of a plurality of different languages; and (ii) performing a script-based language detection test to determine a second set of scores, wherein each score in the second set of scores represents a likelihood that the sanitized text message includes the script for one of the plurality of different languages. The method also includes identifying the language in the sanitized text message based on at least one of the first set of scores, the second set of scores, and a combination of the first and second sets of scores.

In certain implementations, the non-language characters include an emoji and/or a numerical character. The combination can include an interpolation between the first and second sets of scores. In some examples, identifying the language in the sanitized text message includes performing a language detection test on the sanitized text message to generate a third set of scores, wherein each score in the third set of scores represents a likelihood that the sanitized text message includes one of a plurality of different languages. The language detection test can be selected from a plurality of language detection tests, based on the at least one of the first set of scores, the second set of scores, and the combination of the first and second sets of scores.

In certain instances, the language detection test includes a language detection method and one or more classifiers. The language detection method can include, for example, a dictionary-based language detection test, an n-gram language detection test, an alphabet-based language detection test, a script-based language detection test, a user language profile language detection test, or any combination thereof. The one or more classifiers can include, for example, a supervised learning model, a partially supervised learning model, an unsupervised learning model, an interpolation, or any combination thereof. In various implementations, the method includes processing the third set of scores using one or more classifiers to identify the language in the sanitized text message. The method can include outputting, from the one or more classifiers, an indication that the sanitized text message is in the identified language. The indication can include a confidence score.

In another aspect, the subject matter of this disclosure relates to a computer-implemented system for identifying a language in a message. The system includes a sanitizer module, a grouper module, and a language detector module. The sanitizer module obtains a text message and removes non-language characters from the text message to generate a sanitized text message. The grouper module detects at least one of an alphabet and a script present in the sanitized text message and is operable to perform operations including at least one of: performing an alphabet-based language detection test to determine a first set of scores, wherein each score in the first set of scores represents a likelihood that the sanitized text message includes the alphabet for one of a plurality of different languages; and performing a script-based language detection test to determine a second set of scores, wherein each score in the second set of scores represents a likelihood that the sanitized text message includes the script for one of the plurality of different languages. The language detector module identifies the language in the sanitized text message based on at least one of the first set of scores, the second set of scores, and a combination of the first and second sets of scores.

In various examples, the non-language characters include an emoji and/or a numerical character. The combination can include an interpolation between the first and second sets of scores. The grouper module can be operable to perform operations that include selecting the language detector module from a plurality of language detector modules based on the at least one of the first set of scores, the second set of scores, and the combination of the first and second sets of scores. The language detector module can include a language detection methods module. The language detection methods module can be operable to perform operations that include performing a language detection test on the sanitized text message to generate a third set of scores, wherein each score in the third set of scores represents a likelihood that the sanitized text message includes one of a plurality of different languages. The language detection test can include, for example, a dictionary-based language detection test, an n-gram language detection test, an alphabet-based language detection test, a script-based language detection test, a user language profile language detection test, or any combination thereof.

In some implementations, the language detector module includes a classifier module operable to perform operations that include processing the third set of scores using one or more classifiers to identify the language in the sanitized text message. The one or more classifiers can include, for example, a supervised learning model, a partially supervised learning model, an unsupervised learning model, an interpolation, or any combination thereof. The classifier module can be operable to perform operations that include outputting an indication that the sanitized text message is in the identified language. The indication can include a confidence score.

In another aspect, the subject matter of this disclosure relates to an article. The article includes: a non-transitory computer-readable medium having instructions stored thereon that, when executed by one or more computers, cause the computers to perform operations including: obtaining a text message; removing non-language characters from the text message to generate a sanitized text message; detecting at least one of an alphabet and a script present in the sanitized text message, wherein detecting includes at least one of: (i) performing an alphabet-based language detection test to determine a first set of scores, wherein each score in the first set of scores represents a likelihood that the sanitized text message includes the alphabet for one of a plurality of different languages; and (ii) performing a script-based language detection test to determine a second set of scores, wherein each score in the second set of scores represents a likelihood that the sanitized text message includes the script for one of the plurality of different languages. The operations further include identifying the language in the sanitized text message based on at least one of the first set of scores, the second set of scores, and a combination of the first and second sets of scores.

Elements of examples described with respect to a given aspect of this subject matter can be used in various examples of another aspect of the subject matter. For example, it is contemplated that features of dependent claims depending from one independent claim can be used in apparatus, systems, and/or methods of any of the other independent claims.

DETAILED DESCRIPTION

In general, the language detection systems and methods described herein can be used to identify the language in a text message when language information for the message (e.g., keyboard information from a client device) is absent, malformed or unreliable. The systems and methods improve the accuracy of language translation methods used to translate text messages from one language to another. Language translation generally requires the source language to be identified accurately, otherwise the resulting translation can be inaccurate.

Figure 1A:
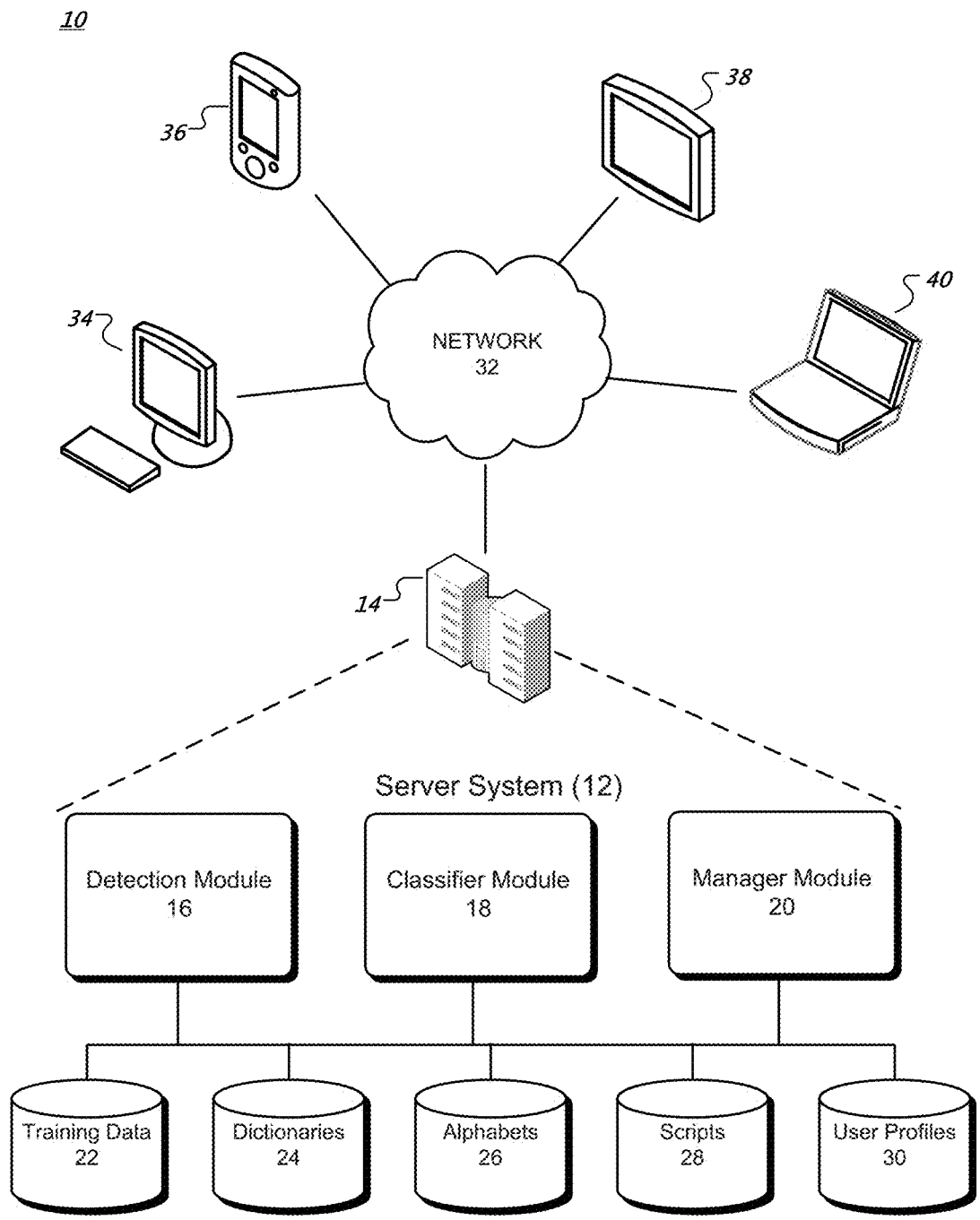
FIG. 1A is a diagram of an example system for performing language detection.

FIG. 1A illustrates an example system 10 for detecting a language in a message, such as a text message or an audio message. A server system 12 provides message analysis and language detection functionality. The server system 12 comprises software components and databases that can be deployed at one or more data centers 14 in one or more geographic locations, for example. The server system 12 software components can comprise a detection module 16, a classifier module 18, and a manager module 20. The software components can comprise subcomponents that can execute on the same or on different individual data processing apparatus. The server system 12 databases can comprise training data 22, dictionaries 24, alphabets 26, scripts 28, and user profile information 30. The databases can reside in one or more physical storage systems. The software components and data will be further described below.

An application, such as a web-based application, can be provided as an end-user application to allow users to provide messages to the server system 12. The end-user applications can be accessed through a network 32 by users of client devices, such as a personal computer 34, a smart phone 36, a tablet computer 38, and a laptop computer 40. Other client devices are possible. The user messages can be accompanied by information about the devices used to create the messages, such as information about the keyboard, client device, and/or operating system used to create the messages.

Although FIG. 1A depicts the classifier module 18 and the manager module 20 as being connected to the databases (i.e., training data 22, dictionaries 24, alphabets 26, scripts 28, and user profile information 30), the classifier module 18 and/or the manager module 20 are not necessarily connected to some or all of the databases. In general, the classifier module 18 can receive input from the detection module 16, and the manager module 20 can receive input from the classifier module 18. No other inputs are required to be received by the classifier module 18 and/or the manager module 20.

Figure 1B:
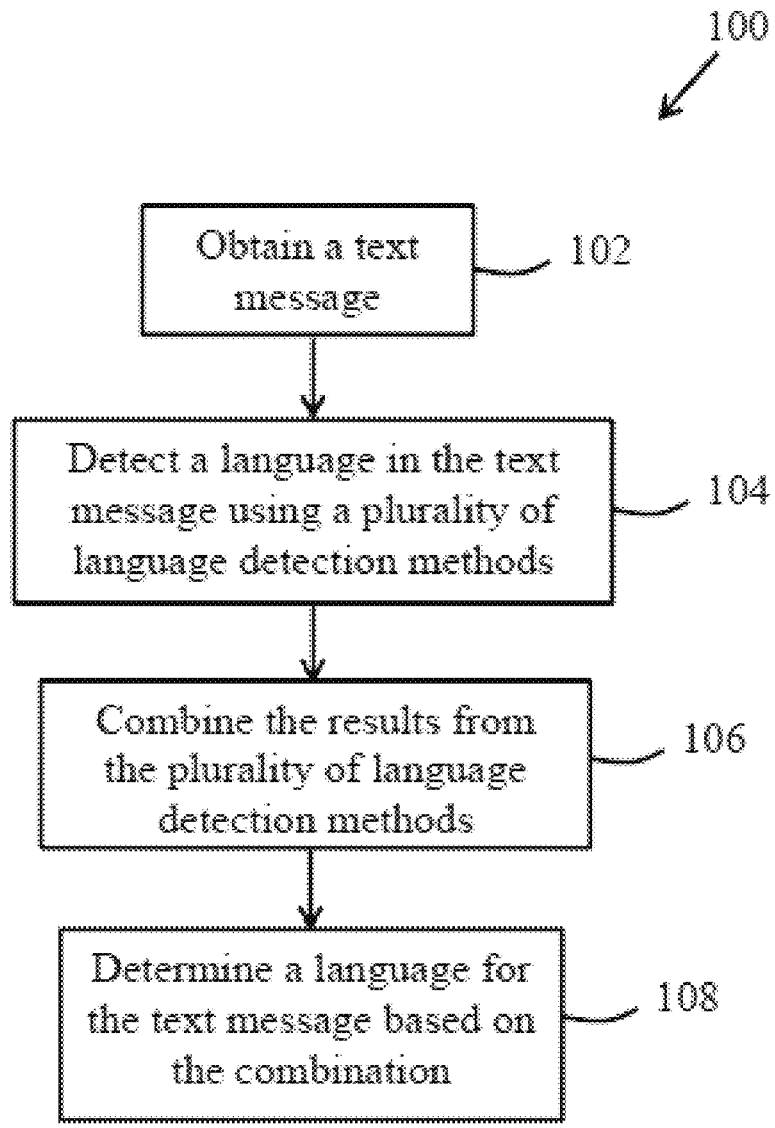
FIG. 1B is a flowchart of an example method of detecting a language in a text message.

FIG. 1B illustrates an example method 100 that uses the system 10 to detect a language in a message. The method 100 begins by receiving or obtaining (step 102) a text message generated by a user. The text message is analyzed (step 104) using one or more language detection methods (e.g., by the detection module 16) that each provide an indication of the language or languages present in the message. The output from the language detection methods is then combined (step 106) using one or more classifiers (e.g., by the classifier module 18) that provide a further indication of the language present in the message. The one or more classifiers can include, for example, a supervised learning model, a partially supervised learning model, an unsupervised learning model, and/or an interpolation. Other classifiers are possible. The output from the one or more classifiers is then used to determine (step 108) the language in the message (e.g., using the manager module 20).

In some implementations, the language indication from the one or more classifiers can be selected by the manager module 20 according to a computed confidence score and/or a linguistic domain. For example, the classifiers can compute a confidence score indicating a degree of confidence associated with the language prediction. Additionally or alternatively, certain classifier output can be selected according to the linguistic domain associated with the user or the message. For example, if the message originated in a computer gaming environment, a particular classifier output can be selected as providing the most accurate language prediction. Likewise, if the message originated in the context of sports (e.g., regarding a sporting event), a different classifier output can be selected as being more appropriate for the sports linguistic domain. Other possible linguistic domains include, for example, news, parliamentary proceedings, politics, health, travel, web pages, newspaper articles, microblog messages, and the like. In general, certain language detection methods or combinations of language detection methods (e.g., from a classifier) can be more accurate for certain linguistic domains, when compared to other linguistic domains. In some implementations, the domain can be determined based on the presence of words from a domain vocabulary in a message. For example, a domain vocabulary for computer gaming could include common slang words used by gamers.

The language detection methods used by the detection module 16 can include, for example, an n-gram method (e.g., a byte n-gram method), a dictionary-based method, an alphabet-based method, a script-based method, and a user language profile method. Other language detection methods are possible. Each of these language detection methods can be used to detect a language present in a message. The output from each method can be, for example, a set or vector of probabilities associated with each possible language in the message. In some instances, two or more of the language detection methods can be performed simultaneously, using parallel computing, which can reduce computation times considerably.

In one implementation, a byte n-gram method uses byte n-grams instead of word or character n-grams to detect languages. The byte n-gram method is preferably trained over a mixture of byte n-grams (e.g., with $1<n<4$), using a naive Bayes classifier having a multinomial event model. The model preferably generalizes to data from different linguistic domains, such that the model's default configuration is accurate over a diverse set of domains, including newspaper articles, online gaming, web pages, and microblog messages. Information about the language identification task can be integrated from a variety of domains.

The task of attaining high accuracy can be relatively easy for language identification in a traditional text categorization setting, for which in-domain training data is available. This task can be more difficult when attempting to use learned model parameters for one linguistic domain to classify or categorize data from a separate linguistic domain. This problem can be addressed by focusing on important features that are relevant to the task of language identification. This can be based on, for example, a concept called information gain, which was originally introduced for decision trees as a splitting criteria, and later found to be useful for selecting features in text categorization. In certain implementations, a detection score can be calculated that represents the difference in information gain relative to domain and language. Features having a high detection score can provide information about language without providing information about domain. For simplicity, the candidate feature set can be pruned before information gain is calculated, by means of a feature selection based on term-frequency.

Figure 2:
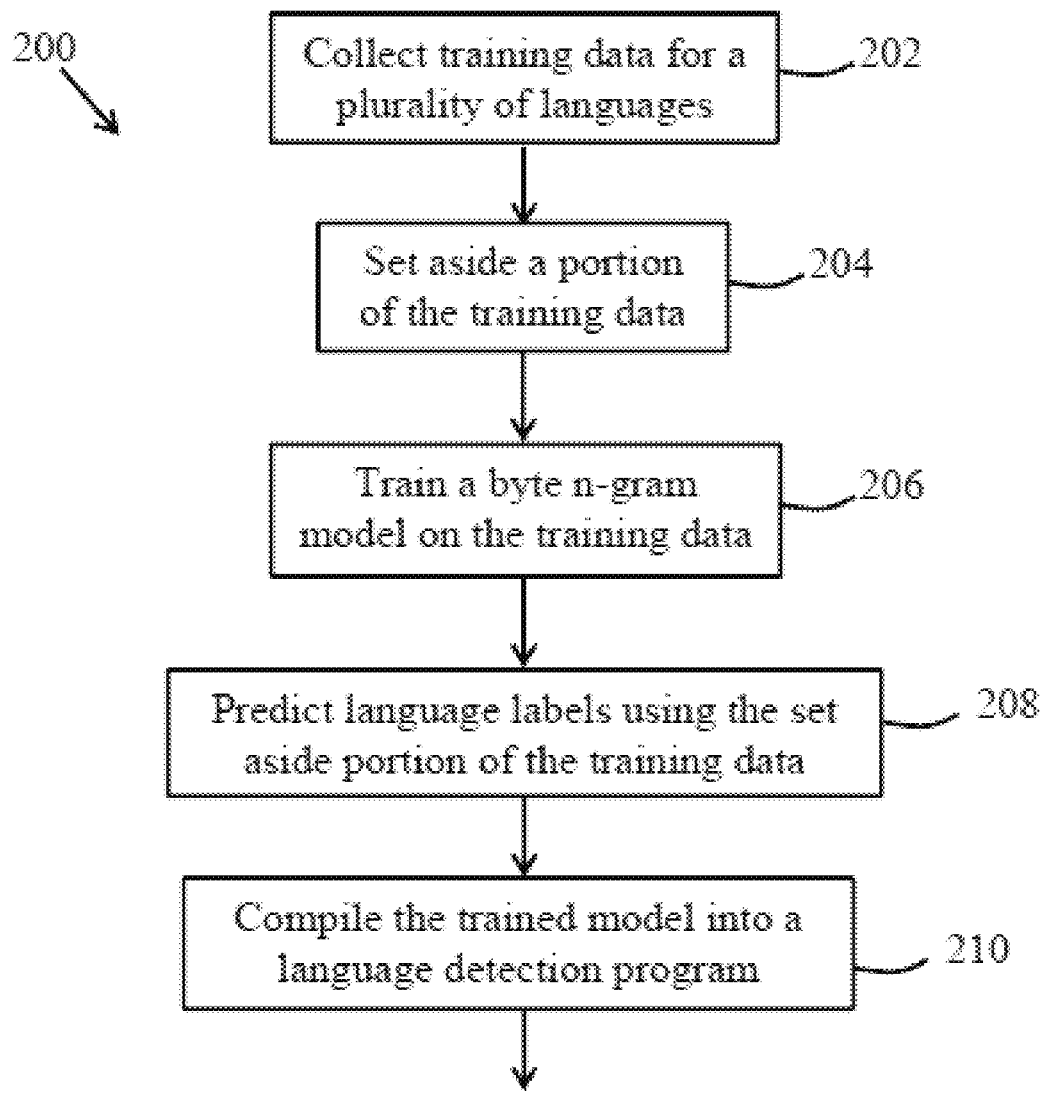
FIG. 2 is a flowchart of an example n-gram method of detecting a language in a text message.

Referring to FIG. 2, an example byte n-gram method 200 begins by training the method using the training data 22. For example, the method can be trained over a mixture of byte n-grams, using the naive Bayes classifier having the multinomial event model. Training data 22 is preferably collected (step 202) for a wide number and variety of languages and adjusted so that the amount of data available per language is made uniform. A small portion of the training data 22 is set aside (step 204) as a test set. Once the training data 22 is selected, a byte n-gram model is trained (step 206) on the training data 22 with appropriate smoothing and backoff techniques. The input features to the model are byte streams from each input sentence, and since the source language label is known for these sentences, the model adjusts its parameters to learn byte sequences typical to a given language. The test set that was isolated in the beginning is then used to predict (step 208) language labels based on the model that had been trained. The accuracy of prediction gives the performance of this byte n-gram language identification system. In some instances, it is difficult to train such a byte n-gram system for each linguistic domain by collecting data across numerous languages for said domain. The difficulty arises from a lack of sufficient data per domain. Hence, these byte n-gram systems are typically trained to cater to a generic domain and not to any specific domains. The trained model can be compiled (step 210) into a program along with intermediate machine parameters. The program can serve as a general purpose language identification system.

In general, the dictionary-based language detection method counts the number of tokens or words belonging to each language by looking up words in a dictionary or other word listing associated with the language. The language having the most words in the message is chosen as the best language. In the case of multiple best languages, the more frequent or commonly used of the best languages can be chosen. The language dictionaries can be stored in the dictionaries database 24.

Figure 3:
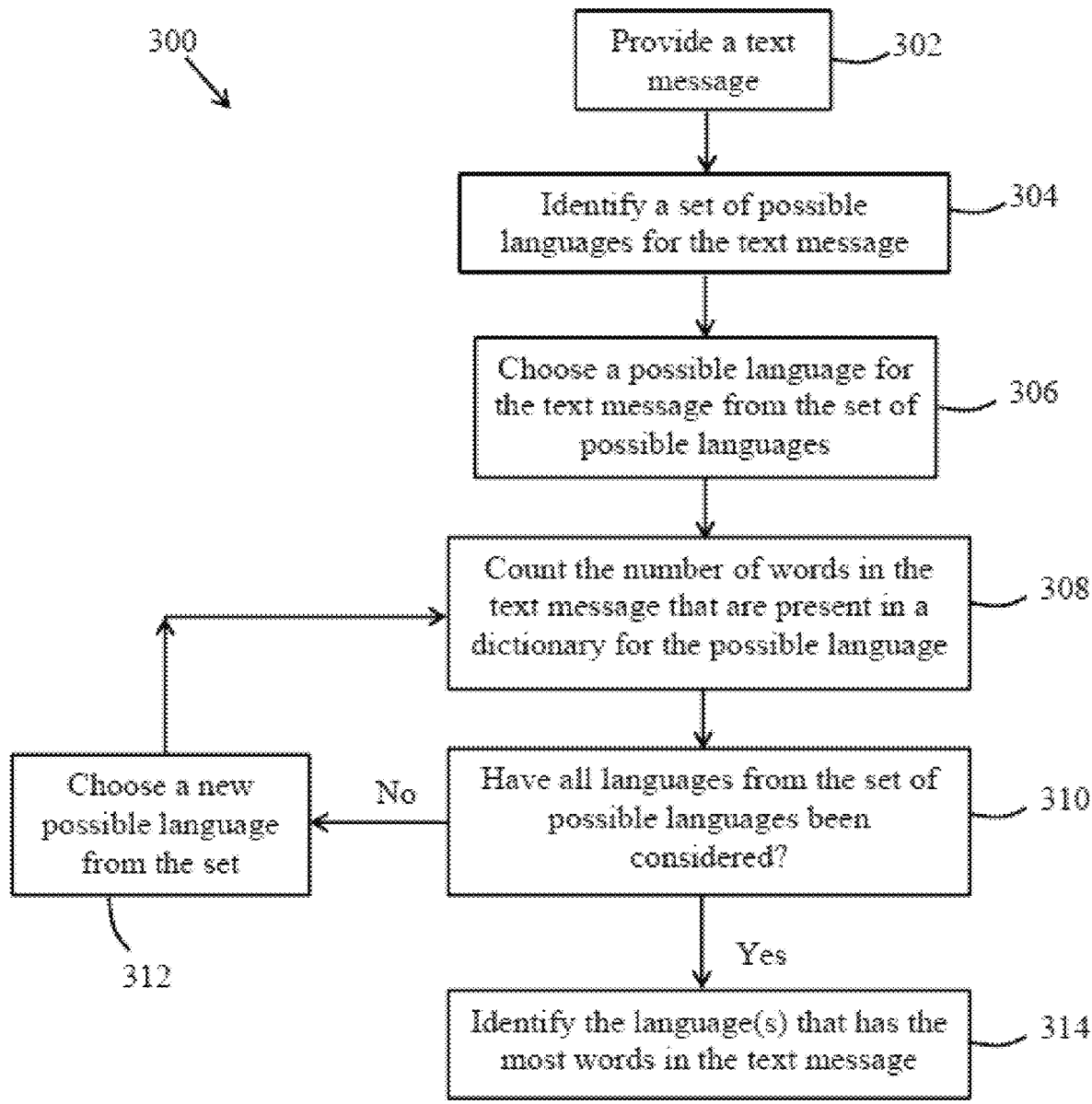
FIG. 3 is a flowchart of an example dictionary-based method of detecting a language in a text message.

FIG. 3 is a flowchart of an example dictionary-based language detection method 300. A text message is provided (step 302) and a set of possible languages for the text message is identified (step 304) using, for example, the detection module 16. A first possible language is then chosen (step 306) from the set. The words in the text message that are present in a dictionary for the possible language are counted (step 308). If additional possible languages from the set have not yet been considered (step 310), a new possible language is selected (step 312), and step 308 is repeated. Once all possible languages from the set have been considered, the language with the most words in the text message can be identified (step 314) as the language in the message. Alternatively or additionally, the method can be used to compute the likelihood that a language is in the message, for each language in the set. For example, the output from the dictionary-based method can be a vector of probabilities for each language in the set.

To ensure accuracy of the dictionary-based language detection method, particularly for short sentences, it is preferable to use dictionaries that include informal words or chat words (e.g., abbreviations, acronyms, slang words, and profanity), in addition to formal words. Informal words are commonly used in short text communications and in chat rooms. The dictionaries are preferably augmented to include informal words on an ongoing basis, as new informal words are developed and used.

The alphabet-based method is generally based on character counts for each language's alphabet and relies on the observation that many languages have unique alphabets or different sets of characters. For example, Russian, English, Korean, and Japanese each use a different alphabet. Although the alphabet-based method can be unable to distinguish some languages precisely (e.g., languages that use similar alphabets, such as Latin languages), the alphabet-based method can generally detect certain languages quickly. In some instances, it is preferable to use the alphabet-based method in combination with one or more other language detection methods (e.g., using a classifier), as discussed herein. The language alphabets can be stored in the alphabets database 26.

Figure 4:
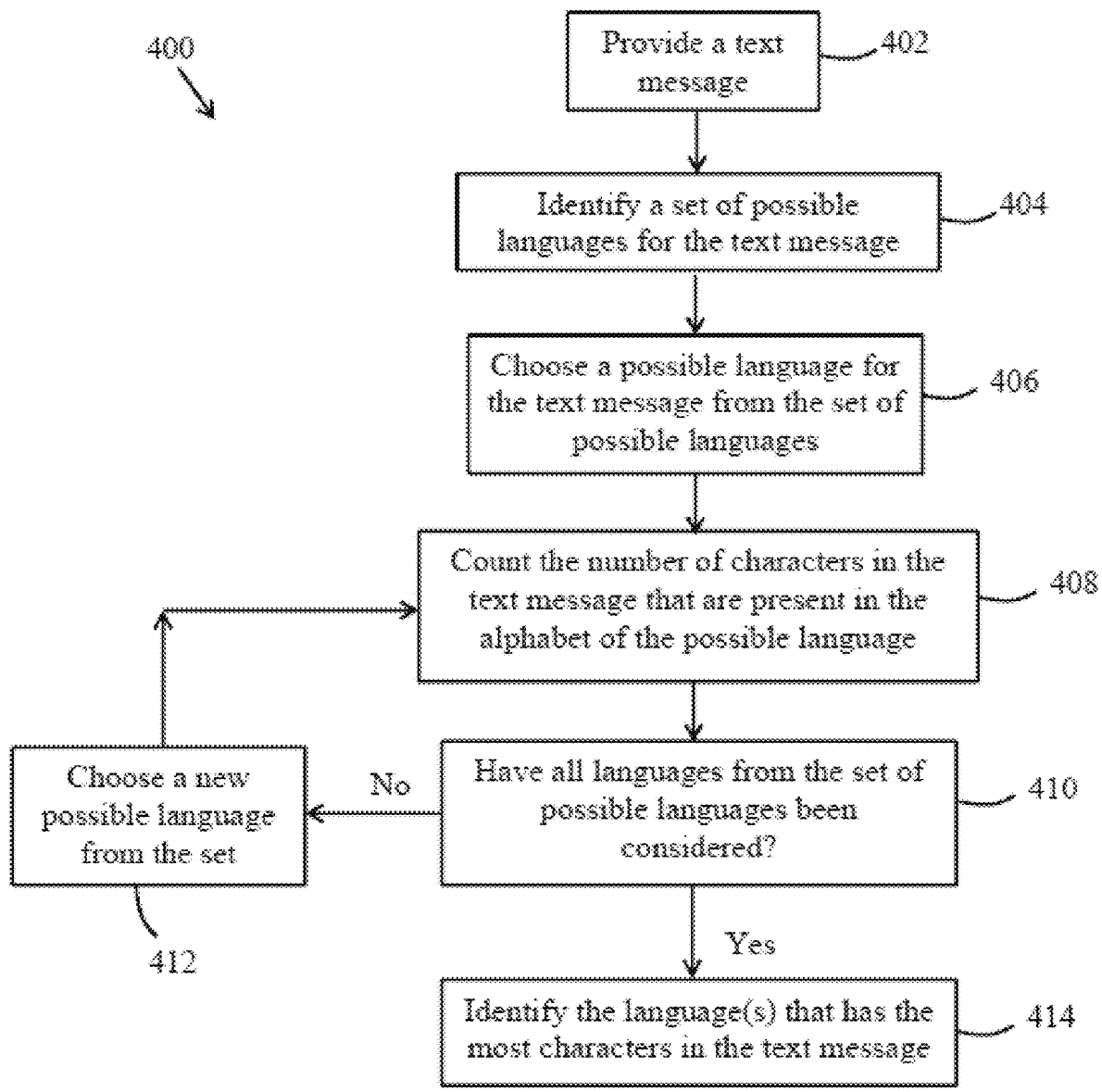
FIG. 4 is a flowchart of an example alphabet-based method of detecting a language in a text message.

FIG. 4 is a flowchart of an example alphabet-based language detection method 400. A text message is provided (step 402) and a set of possible languages for the text message is identified (step 404) using, for example, the detection module 16. A first possible language is then chosen (step 406) from the set. The characters in the text message that are present in an alphabet for the possible language are counted (step 408). If additional possible languages from the set have not yet been considered (step 410), a new possible language is selected (step 412), and step 408 is repeated. Once all possible languages from the set have been considered, the language with the most characters in the text message can be identified (step 414) as the language in the message. Alternatively or additionally, the alphabet-based method can be used to compute a likelihood that a language is in the message, for each language in the set. For example, the output from the alphabet-based method can be a vector of probabilities for each language in the set.

In general, the script-based language detection method determines the character counts for each possible script (e.g. Latin script, CJK script, etc.) that are present in the message. The script-based method relies on the observation that different languages can use different scripts, e.g., Chinese and English. The method preferably uses a mapping that maps a script to a list of languages that use the script. For example, the mapping can consider the UNICODE values for the characters or symbols present in the message, and these UNICODE values can be mapped to a corresponding language or set of possible languages for the message. The language scripts and UNICODE values or ranges can be stored in the scripts database 28.

Figure 5:
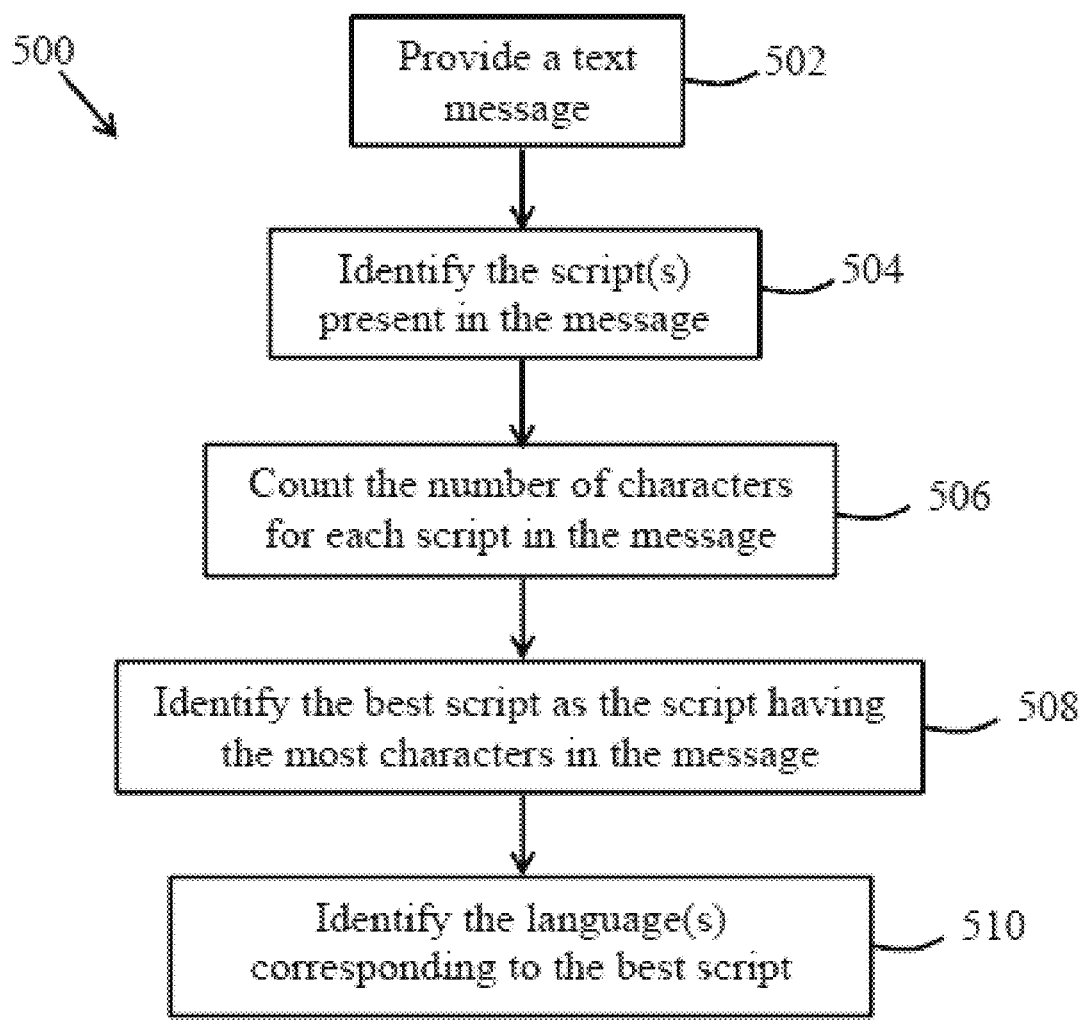
FIG. 5 is a flowchart of an example script-based method of detecting a language in a text message.

Referring to FIG. 5, in an example script-based method 500, a text message is provided (step 502) and the scripts present in the message are identified (step 504) using, for example, the detection module 16. The number of characters falling into each script is then counted (step 506). The script with the highest number of characters is considered to be the best script (step 508), and the languages corresponding to the best script are identified (step 510). When the best script corresponds to only one language, that language can be considered to be the best language. Otherwise, when the best script corresponds more than one language, additional language detection methods can be used to do further detection. In some implementations, the output from the script-based method is a set of probabilities (e.g., in vector form) for each possible language in the message.

The user language profile based method uses the user profile information database 30, which stores historical messages sent by various users. The languages of these stored messages are detected using, for example, one or more other language detection methods described herein (e.g., the byte n-gram method), to identify the language(s) used by each user. For example, if all of a user's prior messages are in Spanish, the language profile for that user can indicate the user's preferred language is Spanish. Likewise, if a user's prior messages are in a mixture of different languages, the language profile for the user can indicate probabilities associated with the different languages (e.g., 80% English, 15% French, and 5% Spanish). In general, the user language profile based method addresses language detection issues associated with very short messages, which often do not have enough information in them to make an accurate language determination. In such an instance, the language preference of a user can be used to predict the language(s) in the user's messages, by assuming the user will continue to use the language(s) he or she has used previously.

Figure 6:
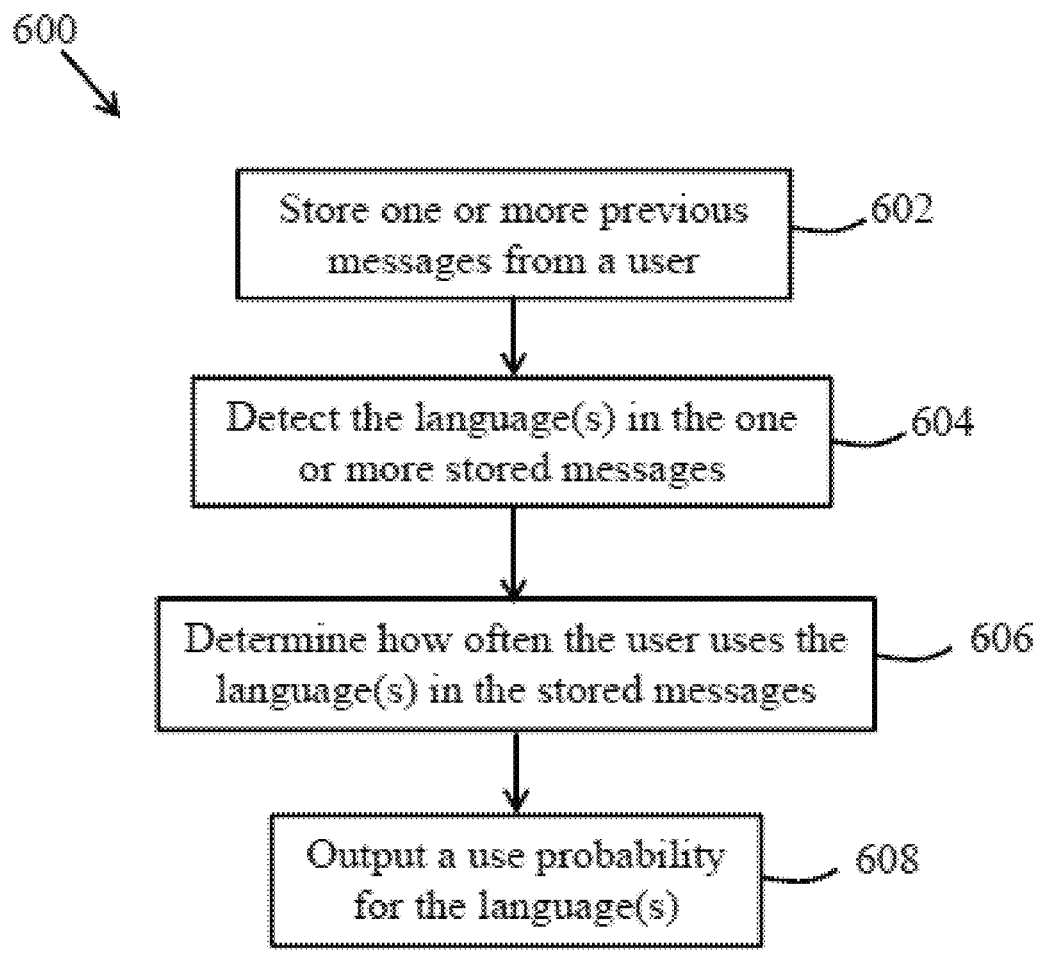
FIG. 6 is a flowchart of an example user language profile method of detecting a language in a text message.

Referring to FIG. 6, an example user language profile detection method 600 begins by storing (step 602) a user's previous messages and detecting (step 604) the language(s) present in the stored messages. The frequency with which different language(s) appear in the user's message is determined (step 606) and a use probability for such language(s) is outputted (step 608).

Figure 7:
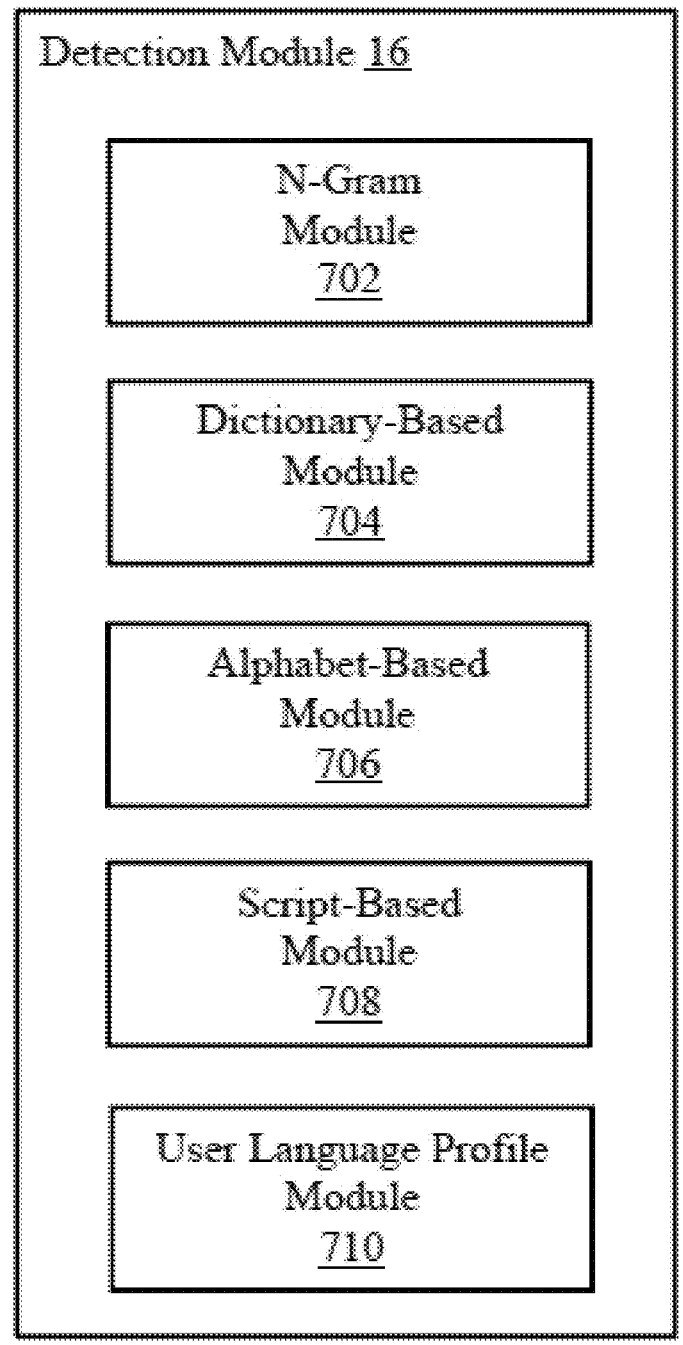
FIG. 7 is a schematic diagram of an example language detection module.

Referring to FIG. 7, the various language detection methods can be incorporated into the detection module 16. A text message can be input into the detection module 16, and one or more of the language detection methods can identify the language(s) in the message. For example, each language detection method can provide a vector of probabilities, where each probability in the vector is associated with a possible language in the message and represents the likelihood that the message is in the given language. Due to the different methods employed and the information available in the message, the probabilities from each language detection method may not be consistent. The detection module 16 can include or utilize, for example, an n-gram module 702 for performing an n-gram detection method (e.g., the byte n-gram detection method 200), a dictionary-based module 704 for performing the dictionary-based method 300, an alphabet-based module 706 for performing the alphabet-based method 400, a script-based module 708 for performing the script-based method 500, and a user language profile module 710 for performing the user language profile method 600. Additional or alternative language detection methods can be incorporated into the detection module 16, as desired. Some known methods include using, for example, word level n-grams, Markov models, and predictive modeling techniques.

Figure 8:
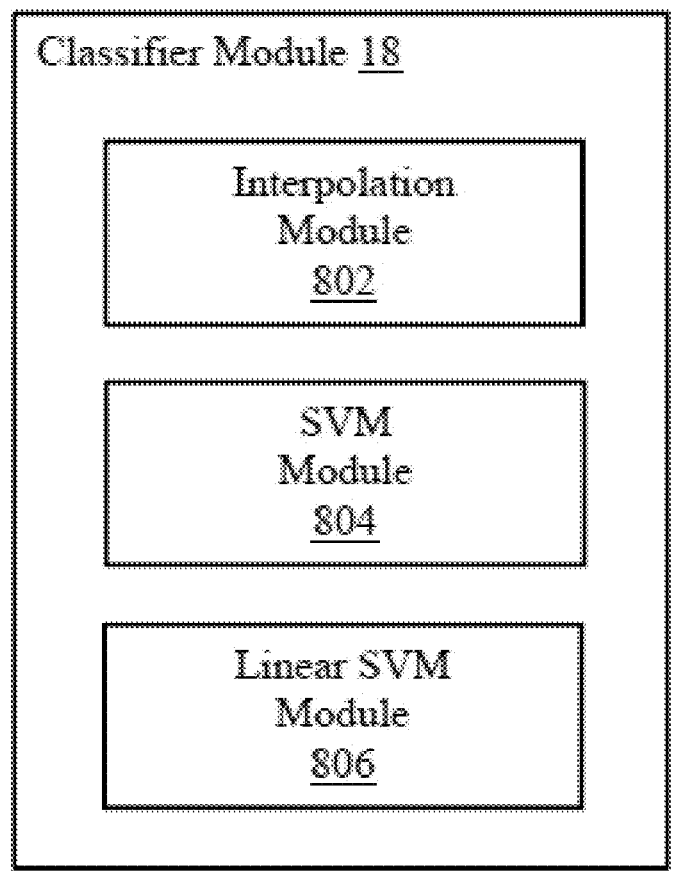
FIG. 8 is a schematic diagram of an example classifier module.

The output from the various language detection methods in the detection module 16 can be combined using the classifier module 18. Referring to FIG. 8, the classifier module 18 can include an interpolation module 802, a support vector machines (SVM) module 804, and a linear SVM module 806.

The interpolation module 802 is used to perform a linear interpolation of the results from two or more language detection methods. For purposes of illustration, the language of a text message can be determined by interpolating between results from the byte n-gram method and the dictionary-based method. For the chat message "lol gtg," the byte n-gram method can determine the likelihood of English is 0.3, the likelihood of French is 0.4, and the likelihood of Polish is 0.3 (e.g., the output from the byte n-gram method can be {en:0.3, fr:0.4, pl:0.3}). The dictionary-based method can determine the likelihood of English is 0.1, the likelihood of French is 0.2, and the likelihood of Polish is 0.7 (e.g., the output can be {en:0.1, fr:0.2, pl:0.7}). To interpolate between the results of these two methods, the output from the byte n-gram method is multiplied by a first weight and the output from the dictionary-based method is multiplied by a second weight, such that the first and second weights add to one. The weighted outputs from the two methods are then added together. For example, if the byte n-gram results are given a weight of 0.6, then the dictionary-based results are given a weight of 0.4, and the interpolation between the two methods is: {en:0.3, fr:0.4, pl:0.3}*0.6+{en:0.1, fr:0.2, pl:0.7}*0.4={en:0.22, fr:0.32, pl:0.46}. Other weightings are possible.

In general, the optimal weights for interpolating between two or more values can be determined numerically through trial and error. Different weights can be tried to identify the best set of weights for a given set of messages. In some instances, the weights can be a function of the number of words or characters in the message. Alternatively or additionally, the weights can depend on the linguistic domain of the message. For example, the optimal weights for a gaming environment can be different than the optimal weights for a sports environment. For a combination of the byte n-gram method and the dictionary-based method, good results can be obtained using a weight of 0.1 on the byte n-gram method and a weight of 0.9 on the dictionary-based method.

The SVM module 804 can be or include a supervised learning model that analyzes language data and recognizes language patterns. The SVM module 804 can be a multi-class SVM classifier, for example. For an English SVM classifier, the feature vector can be the concatenation of the two distributions above (i.e., {en:0.3, fr:0.4, pl:0.3, en:0.1, fr:0.2, pl:0.7}). The SVM classifier is preferably trained on labeled training data. The trained model acts as a predictor for an input. The features selected in the case of language detection can be, for example, sequences of bytes, words, or phrases. Input training vectors can be mapped into a multi-dimensional space. The SVM algorithm can then use kernels to identify the optimal separating hyperplane between these dimensions, which will give the algorithm a distinguishing ability to predict languages (in this case). The kernel can be, for example, a linear kernel, a polynomial kernel, or a radial basis function (RBF) kernel, although other suitable kernels are possible. A preferred kernel for the SVM classifier is the RBF kernel. After training the SVM classifier using training data, the classifier can be used to output a best language among all the possible languages.

The training data can be or include, for example, the output vectors from different language detection methods and an indication of the correct language, for a large number of messages having, for example, different message lengths, linguistic domains, and/or languages. The training data can include a large number of messages for which the language in each message is known.

The linear SVM module 806 can be or include a large-scale linear classifier. An SVM classifier with a linear kernel can perform better than other linear classifiers, such as linear regression. The linear SVM module 806 differs from the SVM module 804 at the kernel level. There are some cases when a polynomial model works better than a linear model, and vice versa. The optimal kernel can depend on the linguistic domain of the message data and/or the nature of the data.

Other possible classifiers used by the systems and methods described herein include, for example, decision tree learning, association rule learning, artificial neural networks, inductive logic programming, random forests, clustering, Bayesian networks, reinforcement learning, representation learning, similarity and metric learning, and sparse dictionary learning. One or more of these classifiers, or other classifiers, can be incorporated into and/or form part of the classifier module 18.

Figure 9:
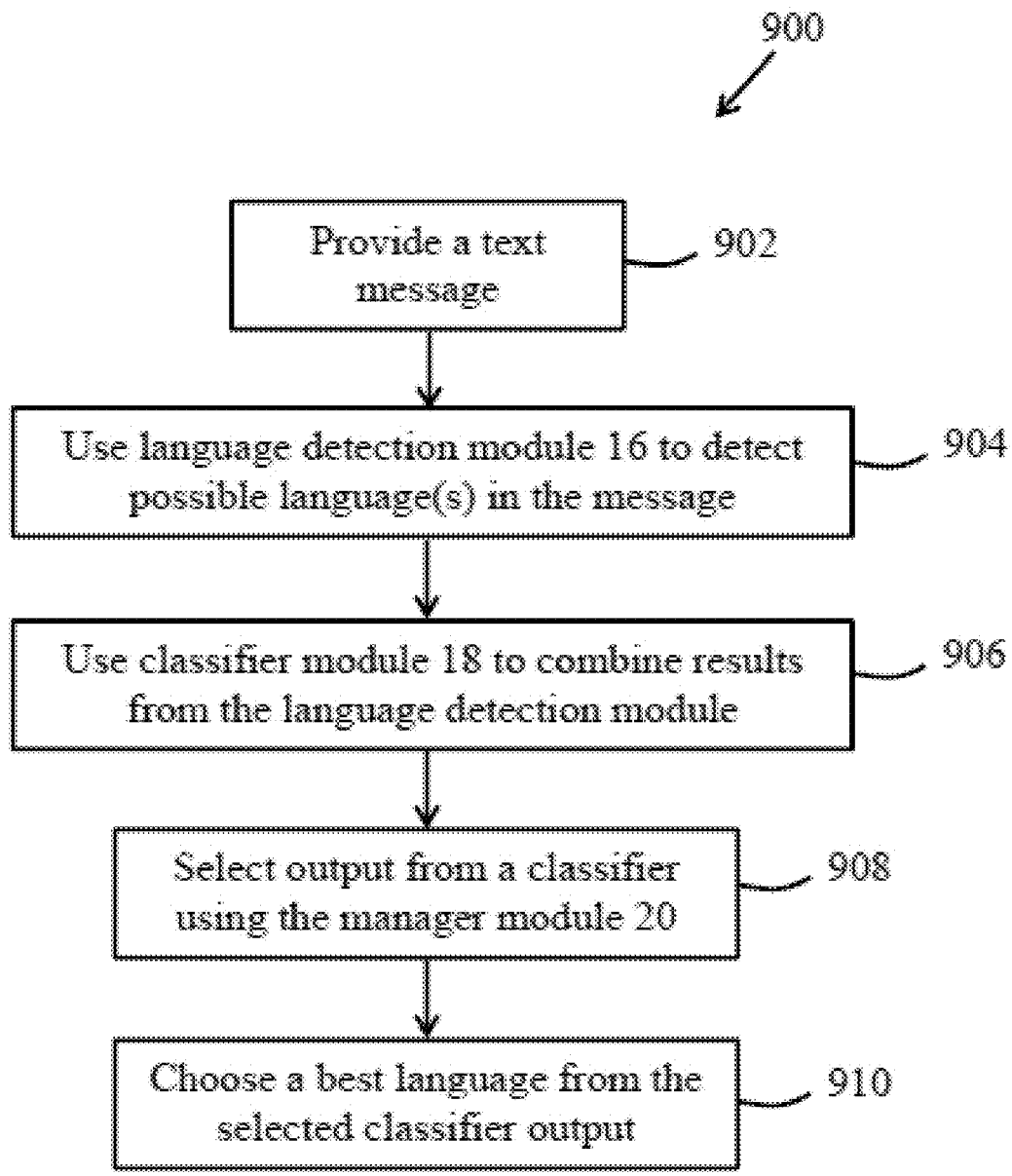
FIG. 9 is a flowchart of an example method of detecting a language in a text message using the language detection module of FIG. 7 and the classifier module of FIG. 8.

Referring to FIG. 9, an example method 900 uses the detection module 16, the classifier module 18, and the manager module 20 to detect the language in a message. The message is provided or delivered (step 902) to the detection module 16. The message can be accompanied by information about the message and/or the user who generated the message. The information can include, for example, an identification number for the user, information about the keyboard used by the user to generate the message, and/or information about the operating system controlling the software used by the user to generate the message. For example, the message can be accompanied by data indicating the user used a French keyboard to generate the message and that user's operating system is in English.

In the detection module 16, one or more language detection methods are used (step 904) to detect a language in the message. Each method used by the detection module 16 can output a prediction regarding the language present in the message. The prediction can be in the form of a vector that includes a probability for each possible language that can be in the message.

The output from the detection module 16 is then delivered to the classifier module 18 where the results from two or more language detection methods can be combined (step 906). Various combinations of the results from the language detection methods can be obtained. In one example, the results from the byte n-gram method and the dictionary-based method are combined in the classifier module 18 by interpolation. In another example, a SVM combination or classification is performed on the results from the byte n-gram method, the dictionary-based method, the alphabet method, and the user profile method. Alternatively or additionally, the combination can include or consider results from the script-based method. A further example includes a large linear combination of the byte n-gram method, the language profile method, and the dictionary method. In general, however, the results from any two or more of the language detection methods can be combined in the classifier module 18.

The method 900 uses the manager module 20 to select output (step 908) from a particular classifier. The output can be selected based on, for example, a confidence score computed by a classifier, an expected language detection accuracy, and/or a linguistic domain for the message. A best language is then chosen (step 910) from the selected classifier output.

Figure 10:
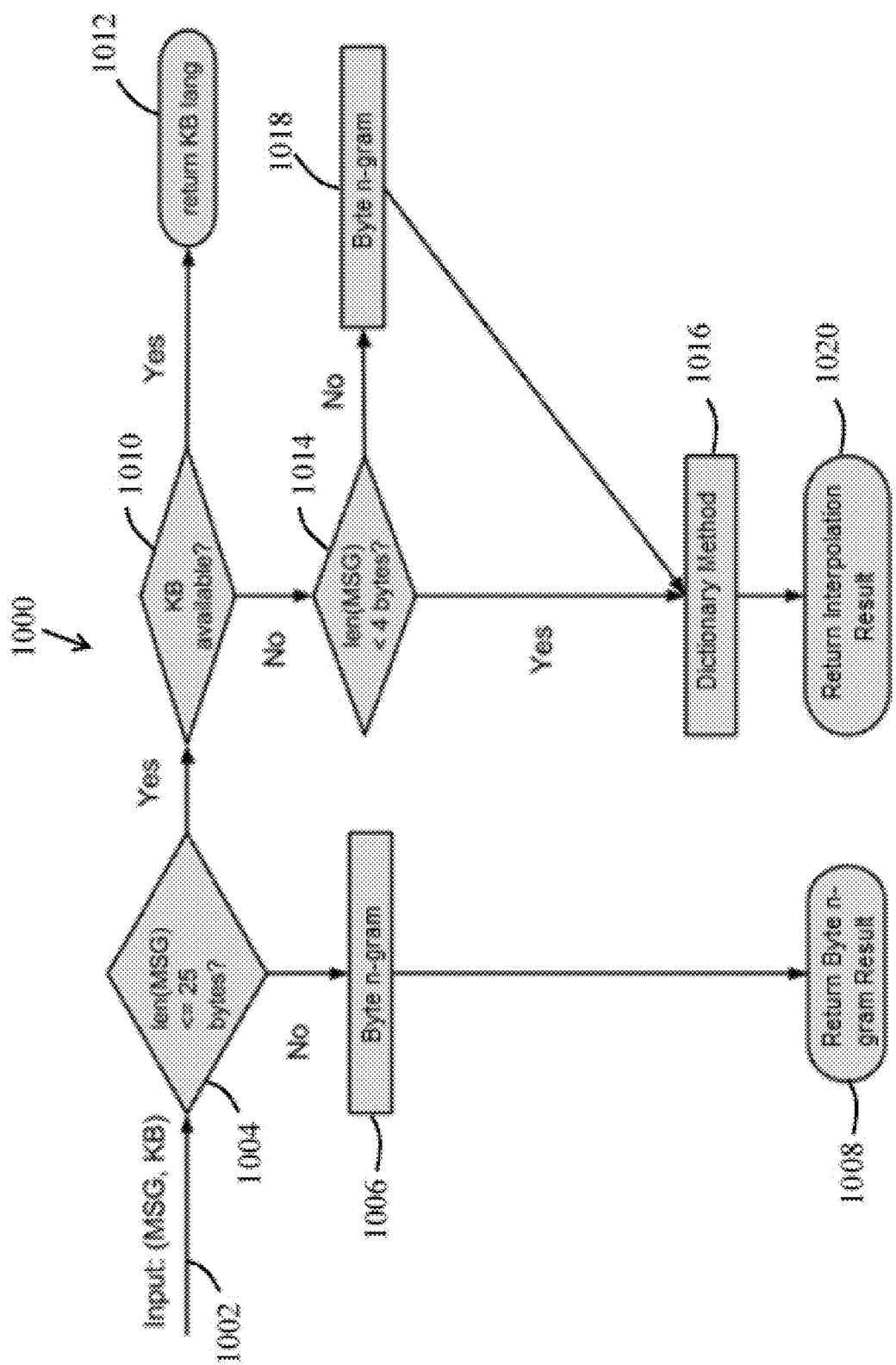
FIG. 10 is a flowchart of an example method of detecting a language in a text message.

In some instances, the systems and methods described herein choose the language detection method(s) according to the length of the message. For example, referring to FIG. 10, a method 1000 includes receiving or providing a message (step 1002) that can include information about the keyboard language used to generate the message. If the message is greater than a threshold length (e.g., 25 bytes or 25 characters, although any suitable threshold length is possible) (step 1004), the language can be detected (step 1006) using the byte n-gram method (or other method or combination of methods). The language of the message can then be chosen (step 1008), based on the results from the byte n-gram method. Otherwise, if the message is less than or equal to the threshold length, the system can determine if the keyboard language is available (step 1010). If the keyboard language is available, the language of the message can be chosen (step 1012) to be the same as the keyboard language. Alternatively, if the keyboard language is not available, the method 1000 can again consider the length of the message. For example, if the message length is less than a second threshold (e.g., 4 bytes or 4 characters, although any suitable second threshold is possible) (step 1014), the language can be detected (step 1016) and chosen using the dictionary-based method. Otherwise, if the message length is greater than the second threshold, the byte n-gram method (or other method or combination of methods) can be used (step 1018) to detect the language in the message. The results from the byte n-gram method and the dictionary-based method can be combined (e.g., using an interpolator or other classifier), and the language of the message can be determined based on the combination (step 1020).

Figure 11:
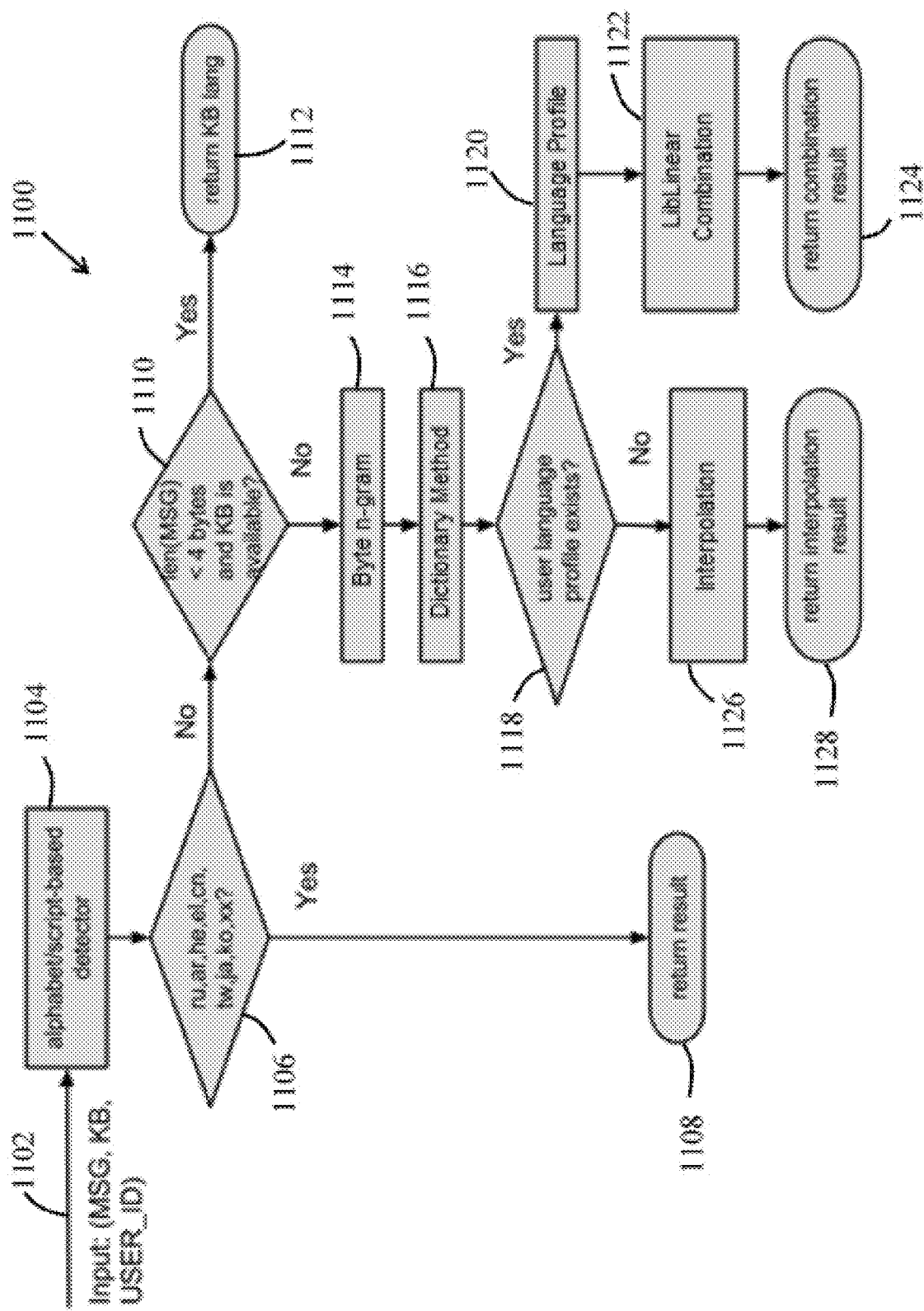
FIG. 11 is a flowchart of an example method of detecting a language in a text message.

FIG. 11 is an example method 1100 of identifying a language in a text message. A text message that was generated on a client device of a user is received or provided (step 1102). The alphabet-based method and/or the script-based method are used to determine (step 1104) an alphabet and/or a script associated with the text message. A candidate language associated with the alphabet and/or the script is identified. If the candidate language is a language with a unique alphabet and/or script (e.g., Russian, Arabic, Hebrew, Greek, Chinese, Taiwanese, Japanese, Korean, or the like) (step 1106), then the candidate language is determined (step 1108) to be the language of the text message.

Otherwise, if the candidate language is not a language with a unique alphabet and/or script, then the length of the text message is evaluated. If the message length is less than a threshold length (e.g., 4 bytes or 4 characters, although any suitable threshold length is possible) and the text message includes or is accompanied by a keyboard language used by the client device (step 1110), then the language of the message is chosen (step 1112) to be the keyboard language. Alternatively, if the message length is greater than the threshold length or the keyboard language is not available, then the message is processed with an n-gram method (e.g., the byte n-gram method) to identify (step 1114) a first set of possible languages for the text message. The message is also then processed with the dictionary-based method to identify (step 1116) a second set of possible languages for the text message. If a user language profile exists for the user (step 1118), then the user language profile is obtained (step 1120) and combined (e.g., using an SVM classifier or a large linear classifier) with the first set of possible languages and the second set of possible languages to obtain a first combination of possible languages (step 1122). The language of the text message is then chosen (step 1124), based on the first combination of possible languages. Otherwise, if the user language profile is not available, then the first set of possible languages and the second set of possible languages are combined (e.g., using a linear interpolator or other classifier) to obtain a second combination of possible languages (step 1126). Finally, the language of the text message is chosen (step 1128), based on the second combination of possible languages.

In some instances, language detection is performed by combining the output from multiple language detection methods in two or more steps. For example, a first step can use the alphabet-script based method to detect special languages that use their own unique alphabets or scripts, such as, for example, Chinese (cn), Japanese (ja), Korean (ko), Russian (ru), Hebrew (he), Greek (el), and Arabic (ar). The alphabet-script based method refers to, for example, using one or both of the alphabet-based method and the script-based method. If necessary, the second step can use a combination (e.g., from a classifier) of multiple detection methods (e.g., the byte n-gram method, the user language profile based method, and the dictionary-based method) to detect other languages (e.g., Latin languages) in the message.

In certain examples, the message provided or received for language detection includes certain digits, characters, or images (e.g., emoticons or emoji) that are not specific to any particular language and/or are recognizable to any user, regardless of language preference. The systems and methods described herein can ignore such characters or images when performing language detection and can ignore messages that include only such characters or images. Alternatively or additionally, the systems and methods can remove such characters or images from messages, prior to performing language detection. The process of removing extraneous characters or images from messages can be referred to herein as sanitizing the messages. The sanitizing process can result in faster detection times and/or improved language detection accuracy.

Figure 12:
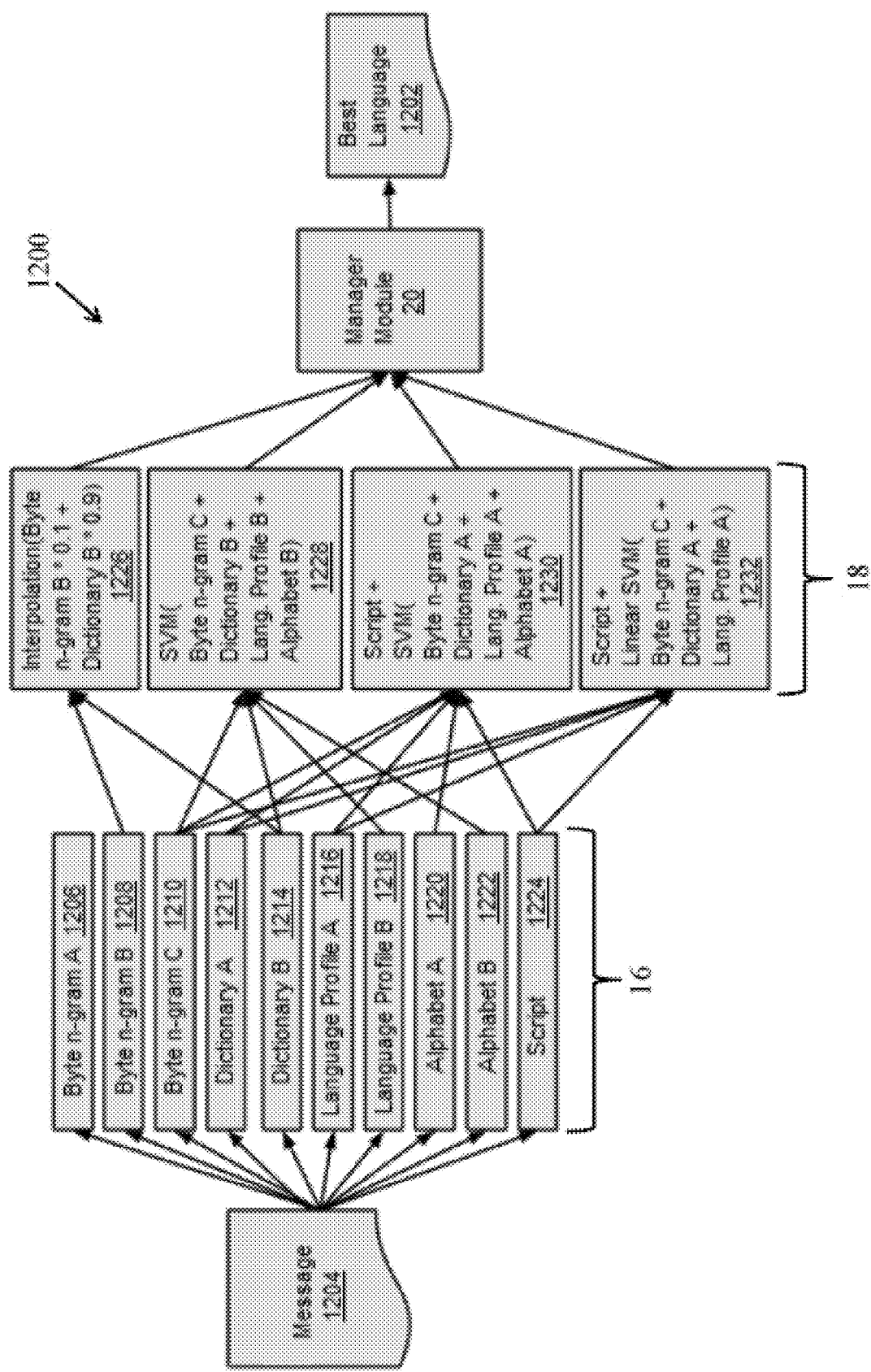
FIG. 12 is a flowchart of an example method of detecting a language in a text message.

FIG. 12 is a flowchart of an example method 1200 for detecting a language in a message. The method uses the detection module 16, the classifier module 18, and the manager module 20 to identify a most likely or best language 1202 for a given input message 1204. The input message 1204 can be accompanied by information about the user or the system(s) used to generate the message. For example, the input message 1204 can be accompanied by a user identification number (or other user identifier), information about the keyboard (e.g., a keyboard language) used to generate the message, and/or information about the operating system (e.g., an operating system language) used to generate the message.

In the depicted example method 1200, the detection module 16 includes ten different language detection methods. Three of the language detection methods in the detection module 16 are Byte n-gram A 1206, Byte n-gram B 1208, and Byte n-gram C 1210, which are all byte n-gram methods and can be configured to detect a different set or number of languages. For example, Byte n-gram A 1206 can be configured to detect 97 languages, Byte n-gram B 1208 can be configured to detect 27 languages, and Byte n-gram C 1210 can be configured to detect 20 languages. Two of the language detection methods in the detection module 16 are Dictionary A 1212 and Dictionary B 1214, which are both dictionary-based methods and can be configured to detect a different set or number of languages. For example, Dictionary A 1212 can be configured to detect 9 languages, and Dictionary B 1214 can be configured to detect 10 languages. Two of the language detection methods in the detection module 16 are Language Profile A 1216 and Language Profile B 1218, which are user language profile methods and can be configured to detect a different set or number of languages. For example, Language Profile A 1216 can be configured to detect 20 languages, and Language Profile B 1218 can be configured to detect 27 languages. Two of the language detection methods in the detection module 16 are Alphabet A 1220 and Alphabet B 1222, which are alphabet-based methods and can be configured to detect a different set or number of languages. For example, Alphabet A 1220 can be configured to detect 20 languages, and Alphabet B 1222 can be configured to detect 27 languages. The detection module 16 also includes a script-based language detection method 1224.

Output from the different language detection methods in the detection module 16 is combined and processed by the classifier module 18. For example, an interpolation classifier 1226 combines output from Byte n-gram B 1208 and Dictionary B 1214. Weights for the interpolation can be, for example, 0.1 for Byte n-gram B 1208 and 0.9 for Dictionary B 1214. The classifier module 18 can also use an SVM classifier 1228 that combines output from Byte n-gram C 1210, Dictionary B 1214, Language Profile B 1218, and Alphabet B 1222. The classifier module 18 can also use a first combination 1230 of the script-based method 1224 and an SVM classifier combination of Byte n-gram C 1210, Dictionary A 1212, Language Profile A 1216, and Alphabet A 1220. Additionally, the classifier module 18 can use a second combination 1232 of the script based method 1224 and a Linear SVM classifier combination of Byte n-gram C 1210, Dictionary A 1212, and Language Profile A 1216. While FIG. 12 shows specific language detection tests, classifiers, and combinations of detection test output being used in the classifier module 18, other language detection tests, classifiers, and/or combinations can be used.

For both the first combination 1230 and the second combination 1232, the script-based method 1224 and the classifier can be used in a tiered approach. For example, the script-based method 1224 can be used to quickly identify languages having unique scripts. When such a language is identified in the message 1204, use of the SVM classifier in the first combination 1230 or the Linear SVM classifier in the second combination may not be required.

In general, the manager module 20 can select specific language detection methods, classifiers, and/or combinations of detection method output to identify the language in the message 1204. The manager module 20 can make the selection according to the linguistic domain or according to an anticipated language for the message. The manager module 20 can select specific classifiers according to a confidence score determined by the classifiers. For example, the manager module 20 can select the output from the classifier that is the most confident in its prediction.

In certain implementations, the systems and methods described herein are suitable for making language detection available as a service to a plurality of users. Such a service is made possible and/or enhanced by the speed at which the systems and methods identify languages, and by the ability of the systems and methods to handle multiple identification techniques at runtime, based on service requests from diverse clients.

Figure 13:
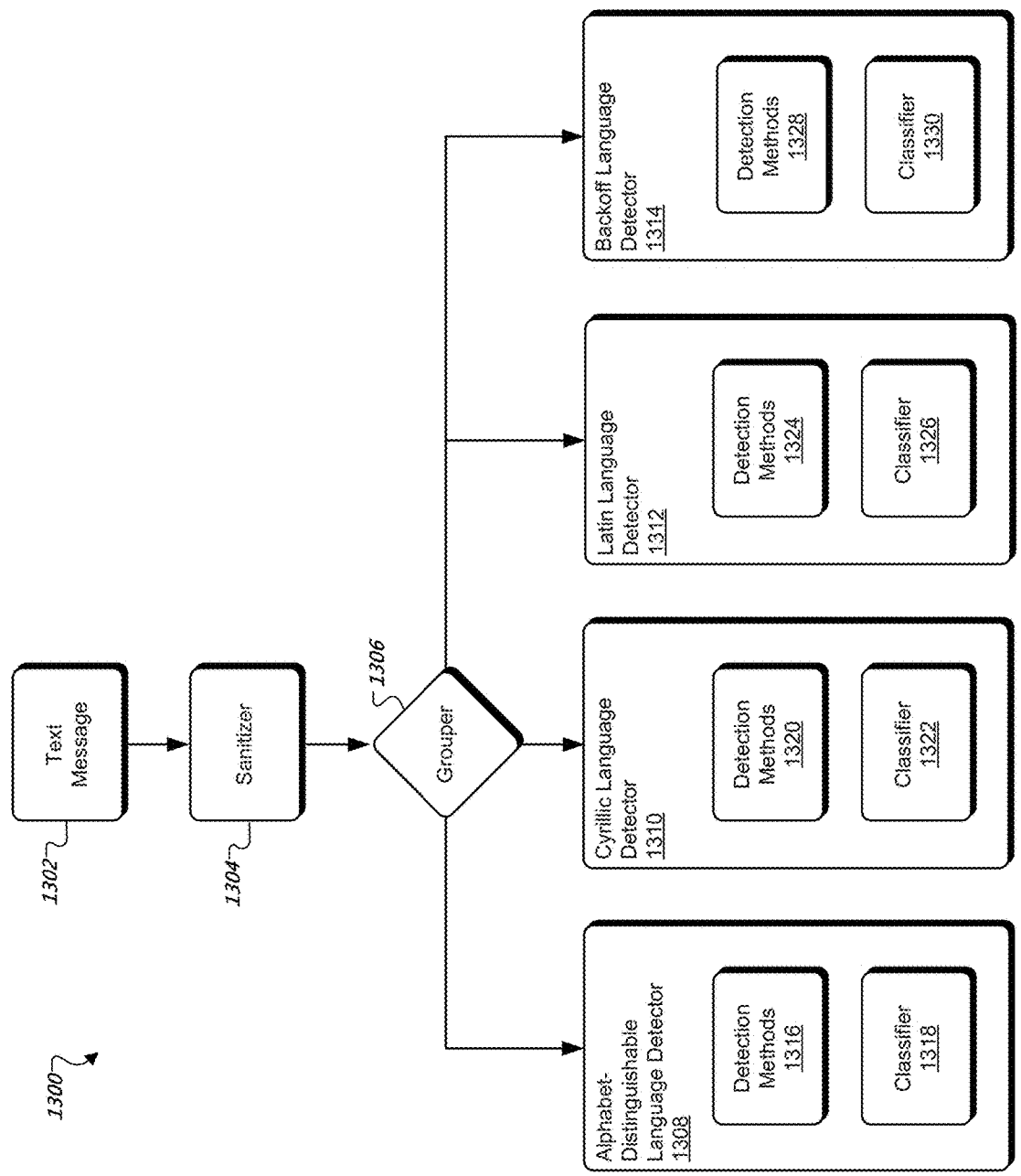
FIG. 13 is a schematic diagram of an example system for detecting a language in a text message.

Referring to FIG. 13, in certain examples, a language detection system 1300 obtains or receives a text message 1302 and uses a sanitizer module 1304, a grouper module 1306, and one or more language detector modules to identify a language present in the text message 1302. In general, the sanitizer module 1304 prepares the text message 1302 for language detection by deleting certain characters or other extraneous elements from the text message 1302. The sanitizer module 1304 can remove, for example, one or more numerical characters (e.g., "1," "3," "15," "249," etc.), one or more emoji (e.g., in the form of images and/or combinations of characters, such as ":-D" or ":-<"), and/or one or more other non-language characters or elements that may not be useful for language detection, such as, for example, certain punctuation marks (e.g., periods or commas), extra spaces, and/or carriage returns. In alternative examples, the extraneous elements are not removed from the text message 1302, but are simply ignored or avoided during subsequent language detection. The sanitizer module 1304 can be used to flag or identify the extraneous elements in such instances. References to "the text message 1302" in subsequent paragraphs are intended to cover, for example, text messages with extraneous elements removed or ignored. In various examples, the extraneous elements are referred to herein as "non-language characters."

In general, the grouper module 1306 is used to perform an initial classification of the language in the text message 1302 and, based on the initial classification, select one or more subsequent language detection methods to make a final determination of the language in the text message 1302. In preferred examples, the grouper module 1306 performs the initial classification by detecting an alphabet and/or a script present in the text message 1302. The alphabet and/or the script can be detected using, for example, the alphabet-based method and/or the script-based method, described herein. In some instances, the alphabet-based method can determine a first set of scores for the text message 1302, with each score representing a probability or likelihood that the alphabet is for one of a plurality of different languages. The grouper module 1306 can detect the alphabet in the text message 1302 based on the highest score from the first set of scores. Likewise, the script-based method can determine a second set of scores for the text message 1302, with each score representing a probability or likelihood that the script is for one of a plurality of different languages. The grouper module 1306 can detect the script in the text message 1302 based on the highest score from the second set of scores. Alternatively or additionally, the grouper module 1306 can combine results or scores (e.g., using an interpolator or other classifier) from the alphabet-based method and the script-based method to detect the alphabet and/or the script in the text message 1302. Once the alphabet and/or the script have been detected, the grouper module 1306 selects a language detector module to use for making a final determination of the language in the text message 1302, as described below and herein. The grouper module 1306 can pass results or other information (e.g., one or more scores) from the alphabet-based method and/or the script-based method to the selected language detector module.

In the depicted example, the language detection system 1300 can include or utilize the following language detector modules: an alphabet-distinguishable language detector 1308, a Cyrillic language detector 1310, a Latin language detector 1312, and a backoff language detector 1314. However, other additional or alternative language detector modules can be included or utilized. Each of these language detector modules 1308, 1310, 1312, and 1314 can include a detection methods module and a classifier module. For example, the alphabet-distinguishable language detector 1308 can include a detection methods module 1316 and a classifier module 1318, the Cyrillic language detector 1310 can include a detection methods module 1320 and a classifier module 1322, the Latin language detector 1312 can include a detection methods module 1324 and a classifier module 1326, and the backoff language detector 1314 can include a detection methods module 1328 and a classifier module 1330.

In general, the detection methods modules 1316, 1320, 1324, and 1328 include or utilize one or more language detection methods, which can be or include, for example, the n-gram method (e.g., the byte n-gram method), the dictionary-based method, the alphabet-based method, the script-based method, and/or the user language profile method. Other language detection methods are contemplated. The detection methods modules 1316, 1320, 1324, and 1328 can use the language detection methods to produce output providing an indication of the language present in the text message 1302. The output can be or include, for example, one or more scores representing a likelihood that the text message 1302 is in one or more languages. In some instances, the language in the text message 1302 is determined directly from the output of one of the detection methods modules 1316, 1320, 1324, or 1328. Alternatively or additionally, the language in the text message 1302 can be determined from the output of one of the classifier modules 1318, 1322, 1326, or 1330. In general, each classifier module 1318, 1322, 1326, or 1330 processes output from a corresponding detection methods module 1316, 1320, 1324, or 1328 to provide a further indication of the language present in a text message. The classifier modules 1318, 1322, 1326, and 1330 preferably use or include one or more classifiers, such as, for example, a supervised learning model, a partially supervised learning model, an unsupervised learning model, and/or an interpolation.

For example, when the alphabet and/or script detected by the grouper module 1306 are associated with one or more alphabet-distinguishable languages, the grouper module 1306 selects the alphabet-distinguishable language detector 1308. In general, an alphabet-distinguishable language is a language that has a unique alphabet or a unique script, such that the language in the text message 1302 can be determined once the alphabet and/or the script for the language are detected. Examples of alphabet-distinguishable languages include, for example, Simplified Chinese (cn), Traditional Chinese (tw), Japanese (ja), Arabic (ar), Hebrew (he), Greek (el), Korean (ko), and Thai (th). In various instances, the grouper module 1306 passes results (e.g., one or more scores or probabilities, a detected alphabet, and/or a detected script) from the alphabet-based method and/or the script-based method to the alphabet-distinguishable language detector 1308. Alternatively or additionally, if the grouper module 1306 does not pass such results to the alphabet-distinguishable language detector 1308, the detection methods module 1316 can perform the alphabet-based method and/or the script-based method to detect the alphabet and/or the script in the text message 1302. The alphabet-distinguishable language detector 1308 can determine the language in the text message 1302 once the alphabet and/or the script are detected. In some instances, such a determination can be made using the classifier module 1318 to process any output from the detection methods module 1316.

In some examples, when the alphabet and/or script detected by the grouper module 1306 are associated with one or more Cyrillic languages, the grouper module 1306 selects the Cyrillic language detector 1310. Examples of Cyrillic languages include, for example, Bulgarian (bg), Ukrainian (uk), and Russian (ru). To determine the specific Cyrillic language in the text message 1302, the detection methods module 1320 can include or utilize one or more language detection methods described herein, such as the byte n-gram method and/or the dictionary-based method. In a preferred example, the detection methods module 1320 utilizes the dictionary-based method, which can use one or more dictionaries specific to Cyrillic languages. The dictionary-based method can count the number of tokens or words in the text message 1302 that belong to one or more Cyrillic languages by looking up words in the one or more dictionaries. In some examples, the Cyrillic language having the most tokens or words in the text message 1302 is determined to be the language in the text message 1302. Alternatively or additionally, the detection methods module 1320 can provide output from one or more language detection methods (e.g., the dictionary-based method) to the classifier module 1322, which can process the output to determine the language in the text message 1302. For example, the classifier module 1322 can receive a set of scores from the detection methods module 1320 and can determine the Cyrillic language in the text message 1302 by identifying the language having the highest score.

In certain instances, when the alphabet and/or script detected by the grouper module 1306 are associated with one or more Latin languages, the grouper module 1306 selects the Latin language detector 1312. Examples of Latin languages include, for example, English (en), French (fr), Spanish (es), German (de), Portuguese (pt), Dutch (nl), Polish (pl), Italian (it), Turkish (tr), Catalan (ca), Czech (cs), Danish (da), Finnish (fi), Hungarian (hu), Indonesian (id), Norwegian (no), Romanian (ro), Slovak (sk), Swedish (sv), Malay (ms), Vietnamese (vi). To determine the specific Latin language in the text message 1302, the detection methods module 1324 can include or utilize one or more language detection methods described herein. In preferred examples, the detection methods module 1324 includes or utilizes the byte n-gram method and/or the dictionary-based method. The output from one or both of these preferred methods can be processed or combined using the classifier module 1326 to determine the specific Latin language in the text message 1302. For example, the n-gram method and the dictionary-based method can each output a set of scores, with each score representing a likelihood that the text message 1302 is in one of a plurality of different Latin languages. The classifier module 1326 can process the sets of scores using, for example, one or more classifiers and/or interpolation techniques described herein, to determine the Latin language in the text message 1302.

In some examples, the grouper module 1306 selects the backoff language detector 1314 to detect a language in the text message 1302. The backoff language detector 1314 can be selected, for example, when the grouper module 1306 does not select the alphabet-distinguishable language detector 1308, the Cyrillic language detector 1310, or the Latin language detector 1312. Such a situation may occur, for example, when the grouper module 1306 fails to detect an alphabet and/or a script associated with an alphabet-distinguishable language, a Cyrillic language, or a Latin language. When the backoff language detector 1314 is selected, the detection methods module 1328 and/or the classifier module 1330 can be used to identify the language in the text message 1302. The language detection methods used by the detection methods module 1328 can be or include, for example, the n-gram method (e.g., the byte n-gram method), the dictionary-based method, the alphabet-based method, the script-based method, the user language profile method, and any combination thereof. The specific classifiers used by the classifier module 1330 can be or include, for example, a supervised learning model, a partially supervised learning model, an unsupervised learning model, an interpolation, and/or any combination thereof. Other language detection methods and/or classifiers can be used. In general, the backoff language detector 1314 can use any of the language detection methods and classifiers described herein. The backoff language detector 1314 is preferably flexible and can be configured to include or use new detection methods and/or new combinations of detection methods as such new methods and/or combinations are developed or become available. In some instances, by resorting to the backoff language detector 1314, the language detection system 1300 is able to provide a valid output rather than a NULL output.

Figure 14:
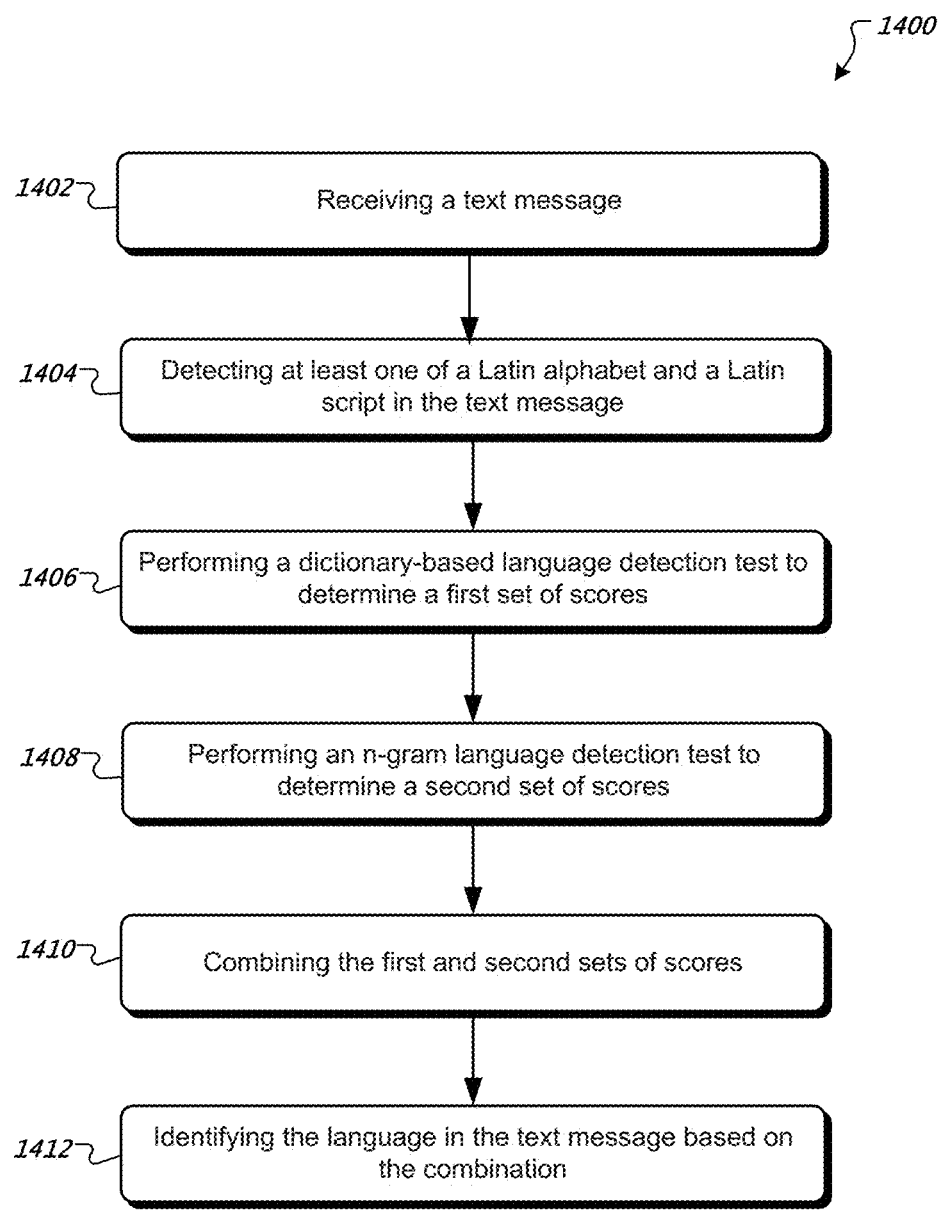
FIG. 14 is a flowchart of an example method of detecting a language in a text message.

For purposes of illustration, FIG. 14 is a flowchart of an example method 1400 for identifying a language in a text message. The method 1400 includes receiving the text message (step 1402) and detecting (step 1404) at least one of a Latin alphabet and a Latin script in the text message. A dictionary-based language detection test is performed (step 1406) to determine a first set of scores, with each score in the first set of scores representing a likelihood that the text message is in one of a plurality of different Latin languages. An n-gram language detection test is performed (step 1408) to determine a second set of scores, with each score in the second set of scores representing a likelihood that the text message is in one of the plurality of different Latin languages. The first and second sets of scores are combined (step 1410) using, for example, one or more classifiers and/or interpolation techniques. The language in the text message is identified (step 1412) based on the combination.

Figure 15:
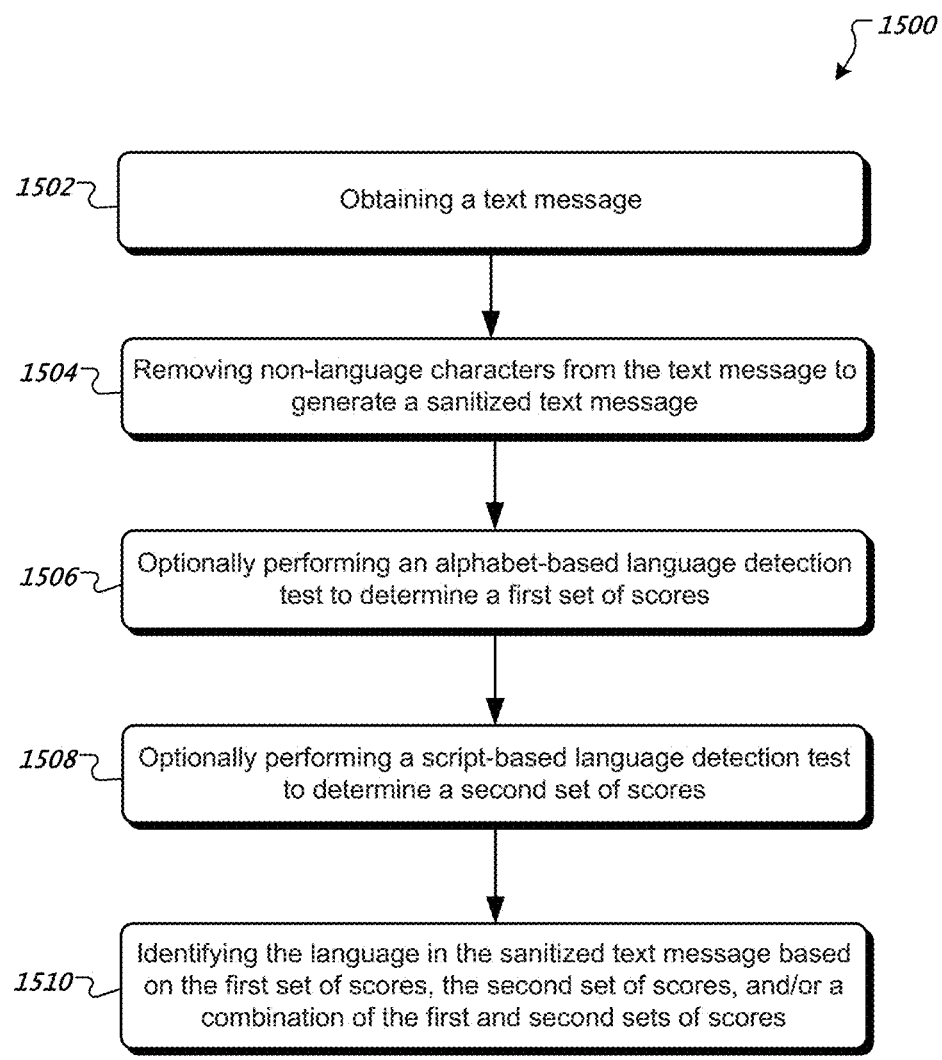
FIG. 15 is a flowchart of an example method of detecting a language in a text message.

FIG. 15 is a flowchart of an example method 1500 for identifying a language in a text message. A text message is obtained (step 1502) and non-language characters are removed (step 1504) from the text message to generate a sanitized text message. An alphabet and/or a script are detected in the sanitized text message by performing at least one of: (i) an alphabet-based language detection test to determine a first set of scores (step 1506) and (ii) a script-based language detection test to determine a second set of scores (step 1508). Each score in the first set of scores represents a likelihood that the sanitized text message includes the alphabet for one of a plurality of different languages. Each score in the second set of scores represents a likelihood that the sanitized text message includes the script for one of the plurality of different languages. The language in the sanitized text message is identified (step 1510) based on the first set of scores, the second set of scores, and/or a combination of the first and second sets of scores.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. For example, parallel processing can be used to perform multiple language detection methods simultaneously. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
   removing non-language characters from a text message to generate a sanitized text message;
   performing a plurality of language detection tests on the sanitized text message,
      wherein each language detection test determines a respective set of scores, and
      wherein each score in the set of scores represents a likelihood that the sanitized text message is in a respective language of a plurality of different languages;
   providing one or more combinations of the score sets as input to a plurality of classifiers,
      wherein each classifier is trained using outputs from different combinations of the language detection tests;
   obtaining as output from at least one of the plurality of classifiers a respective confidence score that the sanitized text message is in one of a plurality of different languages; and
   identifying the language of the sanitized text message based on one of the confidence scores.

2. The method of claim 1, wherein the non-language characters comprise at least one of an emoji, a punctuation mark, an extra space, a carriage return, and a numerical character.

3. The method of claim 1, wherein each language detection test comprises one of a byte n-gram language detection test, a dictionary-based language detection test, an alphabet-based language detection test, a script-based language detection test, and a user language profile language detection test.

4. The method of claim 1, wherein the plurality of language detection tests are performed substantially simultaneously.

5. The method of claim 1, wherein the one or more combinations of the score sets comprise score sets from at least one of a script-based language detection test and an alphabet-based language detection test.

6. The method of claim 1, wherein the one or more combinations of the score sets comprise score sets from a byte n-gram language detection test and a dictionary-based language detection test.

7. The method of claim 1, wherein the score sets comprise at least one score from a user language profile language detection test that identifies a language preference from a user based on previous text messages authored by the user.

8. The method of claim 1, wherein each classifier comprises one of a supervised learning model, a partially supervised learning model, an unsupervised learning model, and an interpolation.

9. The method of claim 1, wherein identifying the language of the sanitized text message comprises:
   selecting the confidence score based on an expected language detection accuracy.

10. The method of claim 1, wherein identifying the language of the sanitized text message comprises:
    selecting the confidence score based on a linguistic domain of the sanitized text message.

11. A system, comprising:
    one or more computer processors programmed to perform operations to:
       remove non-language characters from a text message to generate a sanitized text message;
       perform a plurality of language detection tests on the sanitized text message,
          wherein each language detection test determines a respective set of scores, and
          wherein each score in the set of scores represents a likelihood that the sanitized text message is in a respective language of a plurality of different languages;
       provide one or more combinations of the score sets as input to a plurality of classifiers,
          wherein each classifier is trained using outputs from different combinations of the language detection tests;
       obtain as output from at least one of the plurality of classifiers a respective confidence score that the sanitized text message is in one of a plurality of different languages; and
       identify the language of the sanitized text message based on one of the confidence scores.

12. The system of claim 11, wherein the non-language characters comprise at least one of an emoji, a punctuation mark, an extra space, a carriage return, and a numerical character.

13. The system of claim 11, wherein each language detection test comprises one of a byte n-gram language detection test, a dictionary-based language detection test, an alphabet-based language detection test, a script-based language detection test, and a user language profile language detection test.

14. The system of claim 11, wherein the one or more combinations of the score sets comprise score sets from at least one of a script-based language detection test and an alphabet-based language detection test.

15. The system of claim 11, wherein the one or more combinations of the score sets comprise score sets from a byte n-gram language detection test and a dictionary-based language detection test.

16. The system of claim 11, wherein the score sets comprise at least one score from a user language profile language detection test that identifies a language preference from a user based on previous text messages authored by the user.

17. The system of claim 11, wherein each classifier comprises one of a supervised learning model, a partially supervised learning model, an unsupervised learning model, and an interpolation.

18. The system of claim 11, wherein to identify the language of the sanitized text message the one or more computer processors are further to:
    select the confidence score based on an expected language detection accuracy.

19. The system of claim 11, wherein to identify the language of the sanitized text message the one or more computer processors are further to:
    select the confidence score based on a linguistic domain of the sanitized text message.

20. A non-transitory computer-readable medium having instructions stored thereon that, when executed by one or more computer processors, cause the one or more computer processors to:
    remove non-language characters from a text message to generate a sanitized text message;
    perform a plurality of language detection tests on the sanitized text message,
       wherein each language detection test determines a respective set of scores, and wherein each score in the set of scores represents a likelihood that the sanitized text message is in a respective language of a plurality of different languages;

provide one or more combinations of the score sets as input to a plurality of classifiers,
wherein each classifier is trained using outputs from different combinations of the language detection tests;

obtain as output from at least one of the plurality of classifiers a respective confidence score that the sanitized text message is in one of a plurality of different languages; and identify the language of the sanitized text message based on one of the confidence scores.

* * * * *